US012332640B2

(12) United States Patent
Fish et al.

(10) Patent No.: US 12,332,640 B2
(45) Date of Patent: Jun. 17, 2025

(54) SYSTEMS AND METHODS FOR DYNAMIC SPECIFICATION LIMIT CALIBRATION USING AN INTERACTIVE GRAPHICAL USER INTERFACE AND RELATED SIMULATION

(71) Applicant: JMP Statistical Discovery LLC, Cary, NC (US)

(72) Inventors: Gerald Lee Fish, Martinsville, IN (US); Jason Keith Wiggins, Apex, NC (US); Brady Adams Brady, Wassenaar (NL)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/886,761

(22) Filed: Sep. 16, 2024

(65) Prior Publication Data

US 2025/0093865 A1 Mar. 20, 2025

Related U.S. Application Data

(60) Provisional application No. 63/545,732, filed on Oct. 25, 2023, provisional application No. 63/538,752, filed on Sep. 15, 2023.

(51) Int. Cl.
*G05B 23/02* (2006.01)
*G06F 17/18* (2006.01)

(52) U.S. Cl.
CPC ....... *G05B 23/024* (2013.01); *G05B 23/0281* (2013.01); *G06F 17/18* (2013.01)

(58) Field of Classification Search
CPC .... G05B 23/024; G05B 23/0281; G06F 17/18
See application file for complete search history.

(56) References Cited

U.S. PATENT DOCUMENTS

2012/0095803 A1* 4/2012 Tsuru ............... G06F 17/18
705/7.28
2012/0185221 A1* 7/2012 Mori ............... H05K 13/083
703/2

(Continued)

FOREIGN PATENT DOCUMENTS

CN 115314396 A * 11/2022 ............ G01S 19/23
JP 2006258502 A * 9/2006

(Continued)

OTHER PUBLICATIONS

Kim et al, "Economic design of inspection procedures using guard band when measurement errors are present" Applied Mathematical Modelling 31 (2007) 805-816 (Year: 2007).*

(Continued)

*Primary Examiner* — John C Kuan
(74) *Attorney, Agent, or Firm* — Padowithz Alce; Alce PLLC

(57) ABSTRACT

A system, method, and computer-program product includes obtaining, via a graphical user interface: an input of a measured unit distribution derived from measurements, by a measuring device, of a plurality of instances of a physical unit; an input of characteristics of the measuring device used in the measurements of the plurality of instances of the physical unit; and an input of a type of distribution for fitting a set of measurement values of the physical unit to a target distribution; computing, via a unit distribution estimation algorithm, an estimated true unit distribution of the plurality of instances of the physical unit based on (a) the input of the measured unit distribution, (b) the input of the characteristics of the measuring device, and (c) the input of the type of distribution; and using quantitative characteristics of the estimated true unit distribution to mitigate binning classification error of the physical units.

23 Claims, 13 Drawing Sheets

(56) References Cited

U.S. PATENT DOCUMENTS

2018/0003594 A1* 1/2018 Matsuno .................. G07C 3/14
2023/0273607 A1* 8/2023 Rothering ........ G05B 19/41875
                    700/109

FOREIGN PATENT DOCUMENTS

| JP | 2010210635 A | * | 9/2010 |
| JP | 2011069660 A | * | 4/2011 |

OTHER PUBLICATIONS

Leonov et al., "Evaluation of probabilistic characteristics of measurement results during parts inspection" 2021 J. Phys.: Conf. Ser. 1889 042043 (Year: 2021).*

Donald J. Wheeler, "EMP III Using Imperfect Data, Part One: Characterizing the Measurement Process" 2006, pp. 1-4.

Donald J. Wheeler, "EMP III Using Imperfect Data, Part Four: Explanations" 2006, pp. 1-14.

* cited by examiner

1400

1402
Obtaining via a graphical user interface an input of a measured unit distribution derived from measurements by a measuring device of a plurality of instances of a physical unit

1404
Obtaining via a graphical user interface an input of a plurality of characteristics of the measuring device used in the measurements of the plurality of instances of the physical unit

1406
Obtaining via a graphical user interface an input of a type of distribution for fitting a set of measurement values of the physical unit to a target distribution

1408
Computing via a unit distribution estimation algorithm an estimated true unit distribution of the plurality of instances of the physical unit based on the input of the measured unit distribution, the input of the plurality of characteristics of the measuring device, and the input of the type of distribution

1410
Using quantitative characteristics of the estimated true unit distribution to mitigate binning classification error for given instances of the physical unit

FIG. 7

Describe Gauge Characteristics

Gauge Performance Description

| | Constant (Required) | + C1 * Unit Value (Optional) |
|---|---|---|
| ST Dev= | 0.5 | 0 |
| Bias= | 1.5 | 0 |

- 1702 → Constant (Required) header
- 1702A → ST Dev= row
- 1702B → Bias= row
- 1702C → Optional column value

Gauge Characteristic Graphs

Ensure That Gauge Standard Deviation Is Always Positive Across Part Range.

Gauge SD vs True Unit Value (y-axis: -0.6 to 1.5; x-axis: -100 to 200)

Gauge Bias vs True Unit Value (y-axis: 0.45 to 2.55; x-axis: -100 to 200)

FIG. 10

SYSTEMS AND METHODS FOR DYNAMIC SPECIFICATION LIMIT CALIBRATION USING AN INTERACTIVE GRAPHICAL USER INTERFACE AND RELATED SIMULATION

CROSS-REFERENCE TO RELATED APPLICATIONS

This application claims the benefit of U.S. Provisional Application No. 63/538,752, filed on 15 Sep. 2023, and U.S. Provisional Application No. 63/548,218, filed on Oct. 25, 2023, which are incorporated in their entireties by this reference.

BACKGROUND

In traditional manufacturing environments, specification limits for classifying units are often statically defined based on fixed thresholds. This approach frequently results in misclassifications of units due to inherent variabilities in the measurement devices or processes, which do not account for measurement errors, biases, or changes in operating conditions. Consequently, units that should be classified as conforming may be incorrectly identified as nonconforming and vice versa. Such inaccuracies lead to increased waste, reduced production efficiency, and higher operational costs, as manufacturers must account for potential errors and adjust their processes accordingly.

Therefore, there is a need in the art for a more dynamic and adaptive method that utilizes advanced computational models and user input to generate an estimated true unit distribution, which can be used to more accurately set specification limits and reduce misclassification errors. The embodiments of the present application provide technical solutions that address, at least, the needs described above, as well as the deficiencies of the state of the art.

BRIEF SUMMARY OF THE INVENTION(S)

In some embodiments, a computer-program product comprising a non-transitory machine-readable storage medium storing computer instructions that, when executed by one or more processors, perform operations including: obtaining, via a graphical user interface: an input of a measured unit distribution derived from measurements, by a measuring device, of a plurality of instances of a physical unit; an input of a plurality of characteristics of the measuring device used in the measurements of the plurality of instances of the physical unit; and an input of a type of distribution for fitting a set of measurement values of the physical unit to a target distribution; computing, via a unit distribution estimation algorithm, an estimated true unit distribution of the plurality of instances of the physical unit based on (a) the input of the measured unit distribution, (b) the input of the plurality of characteristics of the measuring device, and (c) the input of the type of distribution; and using quantitative characteristics of the estimated true unit distribution to mitigate binning classification error for the given instances of the physical unit.

In some embodiments, using the quantitative characteristics of the estimated true unit distribution to mitigate binning classification error includes: determining one or more calibrated specification limits based on the quantitative characteristics of the estimated true unit distribution, wherein the one or more calibrated specification limits comprise a modification to one or more previously-provided specification limits based on metrology error associated with the plurality of characteristics of the measuring device.

In some embodiments, using the quantitative characteristics of the estimated true unit distribution to mitigate binning classification error includes: computing one or more calibrated specification limits including computing one or more unit binning thresholds using inputs of (a) one or more previously-provided specification limits and (b) metrology error associated with the plurality of characteristics of the measuring device.

In some embodiments, the one or more calibrated specification limits, when applied to measurement values produced by the measuring device when measuring the given instances of the physical unit, mitigate an error, likely caused by the measuring device, in classifying a subset of the given instances of the physical unit to one or more incorrect bins of a plurality of distinct bins for the physical unit.

In some embodiments, the one or more calibrated specification limits include an upper calibrated specification limit that, when applied to given measurements by the measuring device of the given instances of the physical unit, enables an assignment of a subset of the given instances of the physical unit: to one or more conformant bins for measurement values satisfying the upper calibrated specification limit, or to one or more nonconformant bins for measurement values that do not satisfy the upper calibrated specification limit.

In some embodiments, the one or more calibrated specification limits include a lower calibrated specification limit that, when applied to given measurements by the measuring device of the given instances of the physical unit, enables an assignment of a subset of the given instances of the physical unit: to one or more conformant bins for measurement values satisfying the lower calibrated specification limit, or to one or more nonconformant bins for measurement values that do not satisfy the lower calibrated specification limit.

In some embodiments, using the quantitative characteristics of the estimated true unit distribution to mitigate binning classification error includes: generating one or more simulations identifying likely binning classification error associated with one or more scenarios for measuring the given instances of the physical units based on input by a user.

In some embodiments, a given scenario of the one or more scenarios includes applying an instance of the one or more calibrated specification limits for identifying changes of a false positive rate associated with an incorrect classification of a subset of the given instances of the physical unit to a bin for conforming units of the plurality of distinct bins.

In some embodiments, a given scenario of the one or more scenarios includes applying an instance of the one or more calibrated specification limits for identifying changes of a false negative rate associated with an incorrect classification of a subset of the given instances of the physical unit to a bin for nonconforming units of the plurality of distinct bins.

In some embodiments, the computer-program product further includes inputting to a simulator the plurality of characteristics of the measuring device, the simulator comprising one or more specially encoded memory and one or more computer processors that are in operable communication with the graphical user interface; configuring the simulator with one or more simulator parameters based on the quantitative characteristics of the estimated true unit distribution; executing by the simulator one or more simulations that predict a probability of binning classification error at one or more given specification limits; and displaying, via the graphical user interface, an interactive user interface elements based on one or more outputs of the one or more simulations.

In some embodiments, the computer-program product further includes presenting, via the graphical user interface, a plurality of types of distributions selectable by a user including a non-parametric distribution, wherein the input of the type of distribution includes a selection of the non-parametric distribution.

In some embodiments, a given characteristic of the plurality of characteristics of the measuring device includes a linearity of the measuring device that adversely affects a quality of measurement by the measuring device of the plurality of instances of the physical unit.

In some embodiments, a given characteristic of the plurality of characteristics of the measuring device includes a variance of the measuring device that adversely affects a quality of measurement by the measuring device of the plurality of instances of the physical unit, and a given input for the variance includes a quadratic equation describing an effect of the variance on the measurements of the measuring device.

In some embodiments, a given characteristic of the plurality of characteristics of the measuring device includes a bias of the measuring device that adversely affects a quality of measurement by the measuring device of the plurality of instances of the physical unit, and a given input for the bias includes a quadratic equation describing an effect of the bias on the measurements of the measuring device.

In some embodiments, computing the estimated true unit distribution includes initializing the unit distribution estimation algorithm with an initial distribution shape based on the type of distribution and a bin structure associated with the measured unit distribution, wherein the bin structure identifies a plurality of distinct bin sizes and a corresponding bin range for each of a plurality of distinct bins for the physical unit.

In some embodiments, the computer-program product further includes displaying: in a first portion of the graphical user interface, a graphical data structure that graphically illustrates a performance metric associated with each of a plurality of a possible specification limits; and in a second portion of the graphical user interface, a quantitative data structure that includes a plurality of performance metrics derived based on a selected portion of the graphical data structure.

In some embodiments, the computer-program product further includes receiving, via the graphical user interface, a selection input by a user of a graphical element of the graphical data structure that causes: an automatic change of current values of specification limits designated for the graphical data structure to new values of the specification limits based on the graphical element selected by the user, and an execution of a simulation that re-computes the plurality of performance metrics within the quantitative data structure.

In some embodiments, the computer-program product further includes receiving, via the graphical user interface, a manipulation input of a selection element of the graphical data structure that causes: an automatic change of current values of specification limits designated for the graphical data structure to new values of the specification limits based on the manipulation of the selection element, and an execution of a simulation that re-computes the plurality of performance metrics within the quantitative data structure.

In some embodiments, the computer-program product further includes generating, via the graphical user interface, a misclassification graphical artifact based on the quantitative characteristics of the estimated true unit distribution, the misclassification graphical artifact comprising: a distribution of variations of the measurement device; and a distribution of variations of a measuring process associated with measuring the given instances of the physical unit at one or more given specification limits; simulating a probabilistic error in a binning classification of the given instances of the physical unit measured by the measuring device at the one or more given specification limits based on user inputs manipulating attributes of one or more of the distribution of variations of the measurement device and the distribution of variations of the measuring process.

In some embodiments, determining the one or more calibrated specification limits based on the quantitative characteristics of the estimated true unit distribution enables an encoding of the one or more calibrated specification limits to one or more automated controllers of a computerized binning classification system that routes each of the given instances of the physical unit to one bin of a plurality of distinct bins based on a computed classification for each of the given instances of the physical unit.

In some embodiments, a computer-implemented method includes: obtaining, via a graphical user interface: an input of a measured unit distribution derived from measurements, by a measuring device, of a plurality of instances of a physical unit; an input of a plurality of characteristics of the measuring device used in the measurements of the plurality of instances of the physical unit; and an input of a type of distribution for fitting a set of measurement values of the physical unit to a target distribution; computing, via one or more computer processors executing a unit distribution estimation algorithm, an estimated true unit distribution of the plurality of instances of the physical unit based on (a) the input of the measured unit distribution, (b) the input of the plurality of characteristics of the measuring device, and (c) the input of the type of distribution; and using quantitative characteristics of the estimated true unit distribution to mitigate binning classification error for the given instances of the physical unit.

In some embodiments, using the quantitative characteristics of the estimated true unit distribution to mitigate binning classification error includes: determining one or more calibrated specification limits based on the quantitative characteristics of the estimated true unit distribution, wherein the one or more calibrated specification limits comprise a modification to one or more previously-provided specification limits based on metrology error associated with the plurality of characteristics of the measuring device.

In some embodiments, using the quantitative characteristics of the estimated true unit distribution to mitigate binning classification error includes: computing one or more calibrated specification limits including computing one or more unit binning thresholds using inputs of (a) one or more previously-provided specification limits and (b) metrology error associated with the plurality of characteristics of the measuring device.

In some embodiments, the one or more calibrated specification limits include an upper calibrated specification limit that, when applied to given measurements by the measuring device of the given instances of the physical unit, enables an assignment of a subset of the given instances of the physical unit: to one or more conformant bins for measurement values satisfying the upper calibrated specification limit, or to one or more nonconformant bins for measurement values that do not satisfy the upper calibrated specification limit.

In some embodiments, the one or more calibrated specification limits include a lower calibrated specification limit that, when applied to given measurements by the measuring device of the given instances of the physical unit, enables an assignment of a subset of the given instances of the physical unit: to one or more conformant bins for measurement values satisfying the lower calibrated specification limit, or to one or more nonconformant bins for measurement values that do not satisfy the lower calibrated specification limit.

In some embodiments, computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: obtaining, via a graphical user interface: an input of a measured unit distribution derived from measurements, by a measuring device, of a plurality of instances of a physical unit; an input of a plurality of characteristics of the measuring device used in the measurements of the plurality of instances of the physical unit; and an input of a type of distribution for fitting a set of measurement values of the physical unit to a target distribution; computing, via one or more computer processors executing a unit distribution estimation algorithm, an estimated true unit distribution of the plurality of instances of the physical unit based on (a) the input of the measured unit distribution, (b) the input of the plurality of characteristics of the measuring device, and (c) the input of the type of distribution; and using quantitative characteristics of the estimated true unit distribution to mitigate binning classification error for the given instances of the physical unit.

In some embodiments, using the quantitative characteristics of the estimated true unit distribution to mitigate binning classification error includes: determining one or more calibrated specification limits based on the quantitative characteristics of the estimated true unit distribution, wherein the one or more calibrated specification limits comprise a modification to one or more previously-provided specification limits based on metrology error associated with the plurality of characteristics of the measuring device.

In some embodiments, using the quantitative characteristics of the estimated true unit distribution to mitigate binning classification error includes: computing one or more calibrated specification limits including computing one or more unit binning thresholds using inputs of (a) one or more previously-provided specification limits and (b) metrology error associated with the plurality of characteristics of the measuring device.

In some embodiments, the one or more calibrated specification limits include an upper calibrated specification limit that, when applied to given measurements by the measuring device of the given instances of the physical unit, enables an assignment of a subset of the given instances of the physical unit: to one or more conformant bins for measurement values satisfying the upper calibrated specification limit, or to one or more nonconformant bins for measurement values that do not satisfy the upper calibrated specification limit.

In some embodiments, the one or more calibrated specification limits include a lower calibrated specification limit that, when applied to given measurements by the measuring device of the given instances of the physical unit, enables an assignment of a subset of the given instances of the physical unit: to one or more conformant bins for measurement values satisfying the lower calibrated specification limit, or to one or more nonconformant bins for measurement values that do not satisfy the lower calibrated specification limit.

BRIEF DESCRIPTION OF THE FIGURES

FIG. 7 illustrates an example method for dynamic specification limit calibration using an interactive graphical user interface and related simulation, according to at least one embodiment of the present technology.

FIG. 10 illustrates an example graphical user interface for obtaining input for describing characteristics of a measurement device or other metrology, according to at least one embodiment of the present technology.

DETAILED DESCRIPTION

Overview of Technical Benefits

Figure 1:
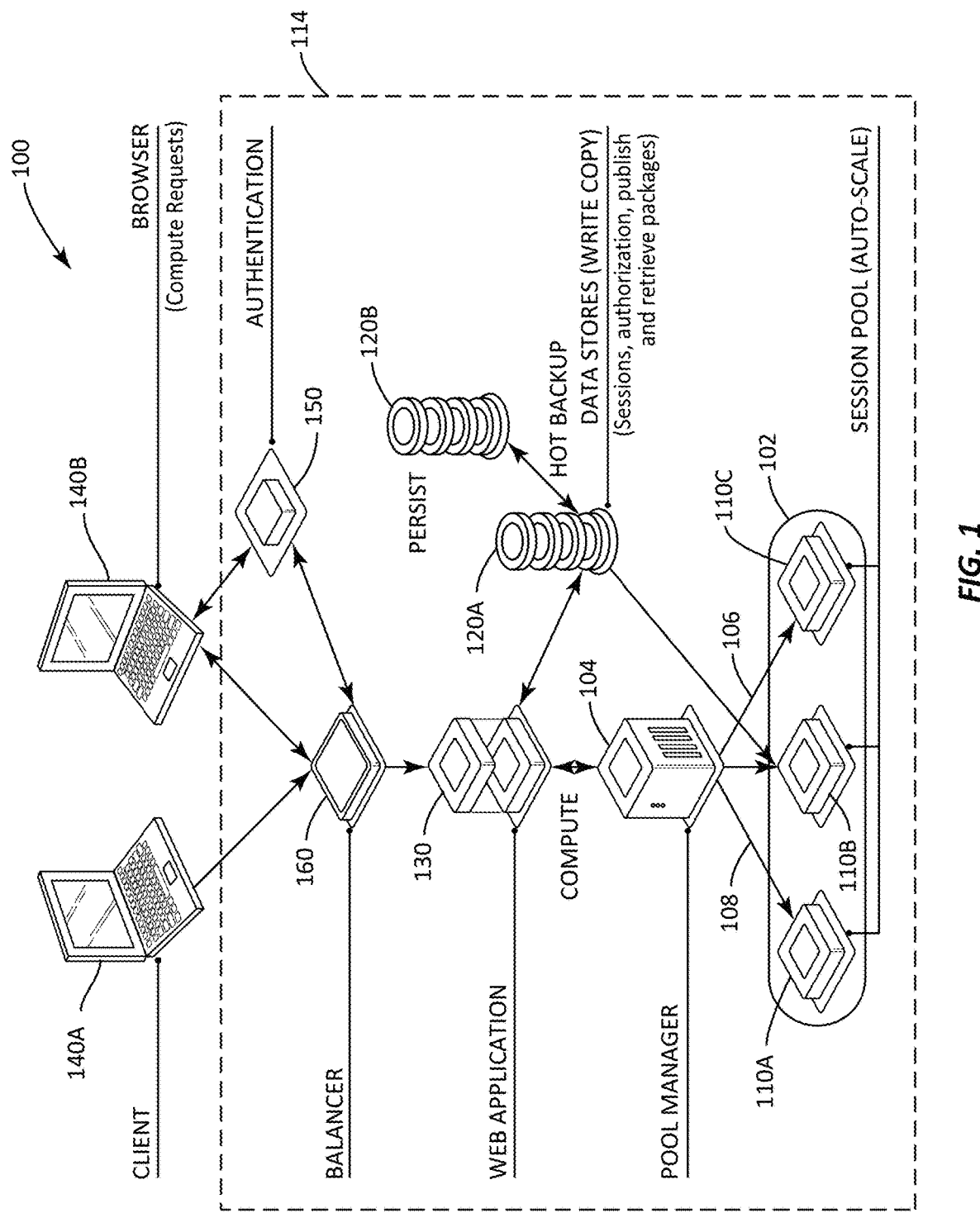
FIG. 1 illustrates an example network, including an example set of devices communicating with each other, according to at least one embodiment of the present technology.

Embodiments of the present application provide technical advantages in accurately estimating a true unit distribution from an arbitrarily-shaped measured unit distribution. Unlike traditional methods that rely on normality assumptions and simple gauge characteristics, embodiments of the present application expand the applicability of the estimation process to accommodate non-standard, complex data shapes and arbitrary gauge characteristics. This provides a broader application scope across various industrial and manufacturing environments where distributions may vary from standard distributions or normal distributions.

A further technical advantage of embodiments of the present application includes the capability to dynamically simulate and analyze the impact of measurement device variations and measurement process variations at one or more given specification limits. This enables users to visualize potential misclassifications and optimize decision-making processes related to binning classification of physical units, thereby reducing the adverse performances associated with both false positive rates and false negative rates errors in the measurement process.

Embodiments of the present application offer a further technical benefit by incorporating a graphical user interface that allows for real-time adjustments of various parameters, such as gauge performance characteristics and specification limits. This interactive element supports better user engagement and provides immediate visual feedback, aiding in the understanding of the measurement system's performance and facilitating the recalibration of specification limits for enhanced measurement accuracy.

Another technical benefit provided by embodiments of the present application is the reduction of waste and optimization of production efficiency. By generating a misclassification graphical artifact based on the quantitative characteristics of the estimated true unit distribution, the system enables more precise calibration of specification limits. This reduces the likelihood of discarding conforming units or accepting non-conforming units, leading to improved resource utilization and cost management.

Additionally, embodiments of the present application further provide a technical advantage by offering a decision support mechanism that quantifies the performance impact of various specification limit settings, allowing users to optimize performance metrics based on the specific loss associated with scrap, rework, or penalties for delivering defective products. This functionality assists in determining the most performance-effective approach to maintaining quality standards while minimizing production loss.

Accordingly, one or more technical benefits of embodiments of the present application lie in an ability to enhance metrological accuracy, reduce waste, improve decision-making processes, and optimize performance efficiency in manufacturing environments, particularly where non-standard data distributions and arbitrary gauge characteristics are encountered. These advantages provide a comprehensive solution for managing the complexities of modern production processes.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

FIG. 1 illustrates an example network 100 including an example set of devices communicating with each other (e.g., over one or more of an exchange system or a network), according to embodiments of the present technology. Network 100 includes network devices configured to communicate with a variety of types of client devices, for example, client devices 140, over a variety of types of communication channels. A client device 140 may be configured to communicate over a public or private network (e.g., client device 140B is configured to support a browser for computing requests or providing authentication).

Network devices and client devices can transmit a communication over a network 100. Network 100 may include one or more of different types of networks, including a wireless network, a wired network, or a combination of a wired and wireless network. Examples of suitable networks include the Internet, a personal area network, a local area network (LAN), a wide area network (WAN), a wireless local area network (WLAN), cloud network, or a cellular network. A wireless network may include a wireless interface or combination of wireless interfaces. As an example, a network in the one or more networks may include a short-range communication channel, such as a Bluetooth or a Bluetooth Low Energy channel. A wired network may include a wired interface. The wired and/or wireless networks may be implemented using routers, access points, base stations, bridges, gateways, or the like, to connect devices in the network. The one or more networks can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS), or other available protocols such as according to an Open Systems Interaction model. In addition, data and/or transactional details may be encrypted. Networks may include other devices for infrastructure for the network. For example, a cloud network may include cloud infrastructure system on demand. As another example, one or more client devices may utilize an Internet of Things (IoT) infrastructure where things (e.g., machines, devices, phones, sensors) can be connected to networks and the data from these things can be collected and processed within the things and/or external to the things. IoT may be implemented with various infrastructure such as for accessibility (technologies that get data and move it), embed-ability (devices with embedded sensors), and IoT services. Industries in the IoT space may include automotive (connected car), manufacturing (connected factory), smart cities, energy and retail.

Network devices and client devices can be different types of devices or components of devices. For example, client device 140 is shown as a laptop and balancer 160 is shown as a processor. Client devices and network devices could be other types of devices or components of other types of devices such as a mobile phone, laptop computer, tablet computer, temperature sensor, motion sensor, and audio sensor. Additionally, or alternatively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, and flow rate sensors. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current. The sensors may be mounted to various components used as part of a variety of different types of systems (e.g., an oil drilling operation). The network devices may detect and record data related to the environment that it monitors and transmit that data to network 100.

As noted, one type of system that may include various sensors that collect data to be processed and/or transmitted to a computing environment (not shown) according to certain embodiments includes an oil drilling system. For example, the one or more drilling operation sensors may include, for example, surface sensors that measure a standpipe pressure, a surface torque, and a rotation speed of a drill pipe, and downhole sensors that measure a rotation speed of a bit and fluid densities. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, for example, the rate of penetration and pump pressure may also be stored and used for modeling, prediction, or classification.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device or client device may include a home automation switch that may be coupled with a home appliance. In another embodiment, a network or client device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment (e.g., computing environment or another computing environment not shown) according to certain embodiments includes a manufacturing environment (e.g., manufacturing products or energy). A variety of different network devices may be included in an energy pool, such as various devices within one or more power plants, energy farms (e.g., wind farm, and solar farm) energy storage facilities, factories, homes and businesses of consumers. One or more of such devices may include one or more sensors that detect energy gain or loss, electrical input or output or loss, and a variety of other efficiencies. These sensors may collect data to inform users of how the energy pool, and individual devices within the pool, may be functioning and how they may be made more efficient. In a manufacturing environment, image data can be taken of the manufacturing process or other readings of manufacturing equipment. For example, in a semiconductor manufacturing environment, images can be used to track, for example, process points (e.g., movement from a bonding site to a packaging site), and process parameters (e.g., bonding force, electrical properties across a bond of an integrated circuit).

Network device sensors may also perform processing on data it collects before transmitting the data to a computing environment, or before deciding whether to transmit data to a computing environment. For example, network devices may determine whether data collected meets certain rules, for example by comparing data or values calculated from the data and comparing that data to one or more thresholds. The network device may use this data and/or comparisons to determine if the data should be transmitted to a computing environment for further use or processing.

Devices in computing environment 114 may include specialized computers, servers, or other machines that are configured to individually and/or collectively process large amounts of data (e.g., using a session pool 102). The computing environment 114 may also include storage devices (e.g., data stores 120) that include one or more databases of structured data, such as data organized in one or more hierarchies, or unstructured data. The databases may communicate with the processing devices within computing environment 114 to distribute data to them and store data used in the computing environment 114. Computing environment 114 may collect, analyze and/or store data from or pertaining to communications, client device operations, client rules, and/or user-associated actions stored at one or more devices in computing environment 114. Such data may influence communication routing to the devices within computing environment 114, and how data is stored or processed within computing environment 114, among other actions.

Network 100 may also include one or more network-attached data stores 120. Network-attached data stores 120 are used to store data to be processed by the computing environment 114 as well as any intermediate or final data generated by the computing system in non-volatile memory. For instance, data stores 120 can perform functions such as writing and copying data and can provide data storage for network functions such as sessions, authorization, publishing and retrieving packages. In certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 120 may store a variety of different types of data organized in a variety of different ways and from a variety of different sources. For example, network-attached data stores 120 may include storage other than primary storage located within computing environment 114 that is directly accessible by processors located therein. Network-attached data stores 120 may include secondary, tertiary, auxiliary, or back-up storage (e.g., data storage 120B), such as large hard drives, servers, and virtual memory, among other types. Storage devices may include portable or non-portable storage devices, optical storage devices, and various other mediums capable of storing and containing data (e.g., computer a machine-readable storage medium or computer-readable storage medium such as computer readable medium 210 in FIG. 2).

Furthermore, the data stores may hold a variety of different types of data. For example, network-attached data stores 120 may hold unstructured (e.g., raw) data, such as manufacturing data (e.g., a database containing records identifying products being manufactured with parameter data for each product, such as performance metrics or criteria) or product sales databases (e.g., a database containing individual data records identifying details of individual product performance).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Other devices can further be used to influence communication routing and/or processing between devices within computing environment 114 and with devices outside of computing environment 114. For example, as shown in FIG. 1, computing environment 114 may include a device 130 supporting a web application. Thus, computing environment 114 can retrieve data of interest, such as client information (e.g., product information, client rules, etc.), technical product details, news, current or predicted weather, and so on. Balancer 160 can be used to balance and direct load within the computing environment 114. Authentication device 150 can be used to provide authentication or other security protocols for a client device, user or group accessing computing environment 114.

In addition to computing environment 114 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from sensors as the sensors continuously sense, monitor and track changes in their environments. Devices within computing environment 114 may also perform pre-analysis on data it receives to determine if the data received should be processed as part of an ongoing project. The data received and collected by computing environment 114, no matter what the source or method or timing of receipt, may be processed over a period of time for a client to determine results data based on the client's needs and rules.

FIG. 1 includes a pool of devices with a pool manager 104 and session pool 102. Network 100 includes a variety of pool managers (e.g., pool manager 104) and worker nodes 110 (e.g., devices, servers, or server farms of session pool 102), according to embodiments of the present technology. Devices of session pool 102 are communicatively connected (e.g., via communication path 108 and communication path 106). Therefore, the pool manager may transmit information (e.g., related to the session pool 102 or notifications), to and receive information from each other. Although only one pool manager 104 is shown in FIG. 1, the network 100 may include more pool managers or a different kind of device manager (e.g., a dedicated resource manager).

Session pool 102 includes one or more worker nodes (e.g., worker node 110A). Shown in FIG. 1 are three worker nodes 110A-C merely for illustration, more or less worker nodes could be present. For instance, the pool manager 104 may itself be a worker node and may not need further worker nodes to complete a task. A given worker node could include dedicated computing resources or allocated computing resources as needed to perform operations as directed by the pool manager 104. The number of worker nodes included in a session pool 102 may be dependent, for example, upon how large the project or data set is being processed by the session pool 102, the capacity of each worker node, and the time designated for the session pool 102 to complete the project. Each worker node within the session pool 102 may be connected (wired or wirelessly, and directly or indirectly) to pool manager 104. Therefore, each worker node may receive information from the pool manager 104 (e.g., an instruction to perform work on a project) and may transmit information to the pool manager 104 (e.g., a result from work performed on a project). Furthermore, worker nodes 110 may communicate with each other (either directly or indirectly). For example, worker nodes 110 may transmit data between each other related to a job being performed or an individual task within a job being performed by that worker node. However, in certain embodiments, worker nodes 110 may not, for example, be connected (communicatively or otherwise) to certain other worker nodes. In an embodiment, worker nodes may only be able to communicate with the pool manager 104 that controls it and may not be able to communicate with other worker nodes in the session pool 102.

The pool manager 104 may connect with other devices of network 100 or an external device (e.g., a pool user, such as a server or computer). For example, a server or computer may connect to pool manager 104 and may transmit a project or job to the node. The project may include a data set. The data set may be of any size. Once the pool manager 104 receives such a project including a large data set, the pool manager 104 may distribute the data set or projects related to the data set to be performed by worker nodes 110. Alternatively, for a project including a large data set, the data set may be received or stored by a machine other than a pool manager 104 or worker node 110 (e.g., a Hadoop data node).

Pool manager may maintain knowledge of the status of the worker nodes 110 in the session pool 102 (i.e., status information), accept work requests from clients, subdivide the work across worker nodes 110, and coordinate the worker nodes 110, among other responsibilities. Worker nodes 110 may accept work requests from a pool manager 104 and provide the pool manager 104 with results of the work performed by the worker nodes 110. A session pool 102 may be started from a single node (e.g., a machine, computer, server, etc.). This first node may be assigned or may start as the primary pool manager 104 that will control any additional nodes that enter the session pool 102.

When a project is submitted for execution (e.g., by a client or a pool manager 104), it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A pool manager may be designated as the primary pool manager among multiple pool managers. A server, computer or other external device may connect to the primary pool manager. Once the pool manager receives a project, the primary pool manager may distribute portions of the project to its worker nodes for execution. For example, when a project is initiated on session pool 102, primary pool manager 104 controls the work to be performed for the project to complete the project as requested or instructed. The primary pool manager may distribute work to the worker nodes 110 based on various factors, such as which subsets or portions of projects may be completed most efficiently and in the correct amount of time. For example, a worker node may perform analysis on a portion of data that is already local (e.g., stored on) the worker node. The primary pool manager also coordinates and processes the results of the work performed by each worker node after each worker node executes and completes its job. For example, the primary pool manager may receive a result from one or more worker nodes, and the pool manager may organize (e.g., collect and assemble) the results received and compile them to produce a complete result for the project received from the end user.

Any remaining pool manager (not shown) may be assigned as backup pool manager for the project. In an embodiment, backup pool manager may not control any portion of the project. Instead, backup pool manager may serve as a backup for the primary pool manager and take over as primary pool manager if the primary pool manager were to fail.

To add another node or machine to the session pool 102, the primary pool manager may open a pair of listening sockets, for example. A socket may be used to accept work requests from clients, and the second socket may be used to accept connections from other pool nodes. The primary pool manager may be provided with a list of other nodes (e.g., other machines, computers, servers) that will participate in the pool, and the role that each node will fill in the pool. Upon startup of the primary pool manager (e.g., the first node on the pool), the primary pool manager may use a network protocol to start the server process on every other node in the session pool 102. Command line parameters, for example, may inform each node of one or more pieces of information, such as: the role that the node will have in the pool, the host name of the primary pool manager, and the port number on which the primary pool manager is accepting connections from peer nodes. The information may also be provided in a configuration file, transmitted over a secure shell tunnel, and recovered from a configuration server. While the other machines in the pool may not initially know about the configuration of the pool, that information may also be sent to each other node by the primary pool manager. Updates of the pool information may also be subsequently sent to those nodes.

For any pool manager other than the primary pool manager added to the pool, the pool manager may open multiple sockets. For example, the first socket may accept work requests from clients, the second socket may accept connections from other pool members, and the third socket may connect (e.g., permanently) to the primary pool manager. When a pool manager (e.g., primary pool manager) receives a connection from another pool manager, it first checks to see if the peer node is in the list of configured nodes in the pool. If it is not on the list, the pool manager may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new pool manager, receives information about another active node, it will check to see if it already has a connection to that other node. If it does not have a connection to that node, it may then establish a connection to that pool manager.

Any worker node added to the pool may establish a connection to the primary pool manager and any other pool manager on the pool. After establishing the connection, it may authenticate itself to the pool (e.g., any pool manager, including both primary and backup, or a server or user controlling the pool). After successful authentication, the worker node may accept configuration information from the pool manager.

When a node joins a session pool 102 (e.g., when the node is powered on or connected to an existing node on the pool or both), the node is assigned (e.g., by an operating system of the pool) an identifier (e.g., a universally unique identifier (UUID)). This identifier may help other nodes and external entities (devices, users, etc.) to identify the node and distinguish it from other nodes. When a node is connected to the pool, the node may share its identifier with the other nodes in the pool. Since each node may share its identifier, each node may know the identifier of every other node on the pool. Identifiers may also designate a hierarchy of each of the nodes (e.g., backup pool manager) within the pool. For example, the identifiers of each of the backup pool manager may be stored in a list of backup pool manager to indicate an order in which the backup pool manager will take over for a failed primary pool manager to become a new primary pool manager. However, a hierarchy of nodes may also be determined using methods other than using the unique identifiers of the nodes. For example, the hierarchy may be predetermined or may be assigned based on other predetermined factors.

The pool may add new machines at any time (e.g., initiated from any pool manager). Upon adding a new node to the pool, the pool manager may first add the new node to its table of pool nodes. The pool manager may also then notify every other pool manager about the new node. The nodes receiving the notification may acknowledge that they have updated their configuration information.

Primary pool manager 104 may, for example, transmit one or more communications to backup pool manager or other control or worker nodes within the session pool 102). Such communications may be sent using protocols such as periodically, at fixed time intervals, or between known fixed stages of the project's execution. The communications transmitted by primary pool manager 104 may be of varied types and may include a variety of types of information. For example, primary pool manager 104 may transmit snapshots (e.g., status information) of the session pool 102 so that backup pool manager 104 always has a recent snapshot of the session pool 102. The snapshot or pool status may include, for example, the structure of the pool (including, for example, the worker nodes in the pool, unique identifiers of the nodes, or their relationships with the primary pool manager) and the status of a project (including, for example, the status of each worker node's portion of the project). The snapshot may also include analysis or results received from worker nodes in the session pool 102. The backup pool manager may receive and store the backup data received from the primary pool manager. The backup pool manager may transmit a request for such a snapshot (or other information) from the primary pool manager, or the primary pool manager may send such information periodically to the backup pool manager.

As noted, the backup data may allow the backup pool manager to take over as primary pool manager if the primary pool manager fails without requiring the pool to start the project over from scratch. If the primary pool manager fails, the backup pool manager that will take over as primary pool manager may retrieve the most recent version of the snapshot received from the primary pool manager and use the snapshot to continue the project from the stage of the project indicated by the backup data. This may prevent failure of the project as a whole.

A backup pool manager may use various methods to determine that the primary pool manager has failed. In one example of such a method, the primary pool manager may transmit (e.g., periodically) a communication to the backup pool manager that indicates that the primary pool manager is working and has not failed, such as a heartbeat communication. The backup pool manager may determine that the primary pool manager has failed if the backup pool manager has not received a heartbeat communication for a certain predetermined period of time. Alternatively, a backup pool manager may also receive a communication from the primary pool manager itself (before it failed) or from a worker node that the primary pool manager has failed, for example because the primary pool manager has failed to communicate with the worker node.

Different methods may be performed to determine which backup pool manager of a set of backup pool manager will take over for failed primary pool manager 104 and become the new primary pool manager. For example, the new primary pool manager may be chosen based on a ranking or "hierarchy" of backup pool manager based on their unique identifiers. In an alternative embodiment, a backup pool manager may be assigned to be the new primary pool manager by another device in the session pool 102 or from an external device (e.g., a system infrastructure or an end user, such as a server or computer, controlling the session pool 102). In another alternative embodiment, the backup pool manager that takes over as the new primary pool manager may be designated based on bandwidth or other statistics about the session pool 102.

A worker node within the session pool 102 may also fail. If a worker node fails, work being performed by the failed worker node may be redistributed amongst the operational worker nodes. In an alternative embodiment, the primary pool manager may transmit a communication to each of the operable worker nodes still on the session pool 102 that each of the worker nodes should purposefully fail also. After each of the worker nodes fail, they may each retrieve their most recent saved checkpoint of their status and re-start the project from that checkpoint to minimize lost progress on the project being executed.

Figure 2:
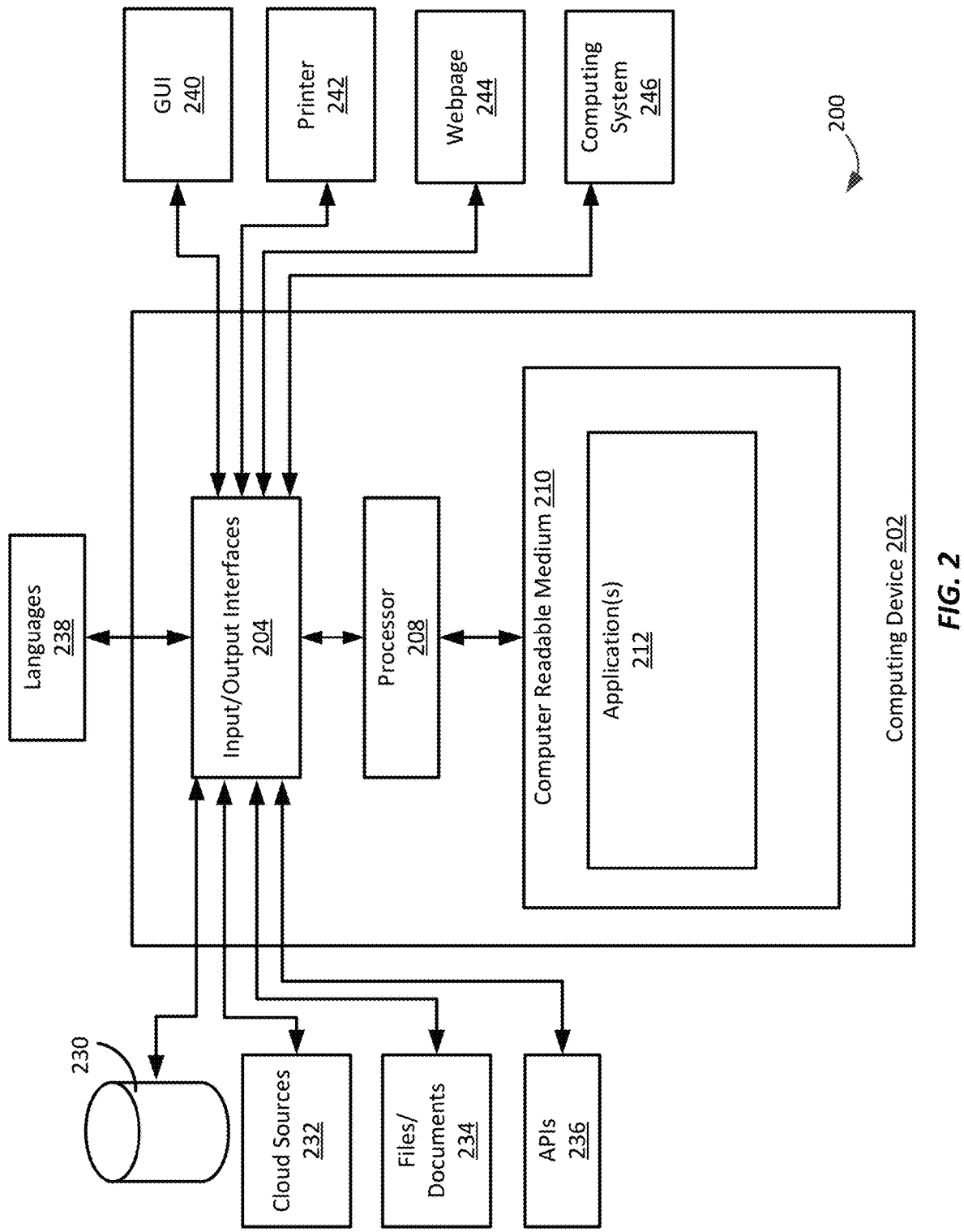
FIG. 2 illustrates a block diagram that provides an illustration of the hardware components of a computing system, according to at least one embodiment of the present technology.

While each device in FIG. 1 is shown as a single device, it will be appreciated that multiple devices may instead be used. FIG. 2 shows an example computing structure for a device in FIG. 2. FIG. 2 includes a computing device 202. The computing device 202 has a computer-readable medium 210 and a processor 208. Computer-readable medium 210 is an electronic holding place or storage for information so the information can be accessed by processor 208. The computer readable medium 210 is a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including, for example, memory sharing, message passing, token passing, and network transmission. Computer-readable medium 210 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 208 executes instructions (e.g., stored at the computer-readable medium 210). The instructions can be carried out by a special purpose computer, logic circuits, or hardware circuits. In one or more embodiments, processor 208 is implemented in hardware and/or firmware. Processor 208 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 208 in one or more embodiments can retrieve a set of instructions from a permanent memory device and copy the instructions in an executable form to a temporary memory device that is generally some form of RAM, for example. Processor 208 operably couples with components of computing device 202 (e.g., input/output interface 204 and with computer readable medium 210) to receive, to send, and to process information.

For instance, in one or more embodiments, computing device 202 sends and/or receives information from one or more of databases 230, cloud sources 232, application programming interfaces 236 (API's), graphical user interfaces 240 (GUIs), printers 242, webpages 244, and computing systems 246. The input/output interface 204 may be configured to receive languages 238 (e.g., to communicate with other computing systems 246) or specific electronic files or documents 234 (e.g., inputs for building models or designing experiments). The input/output interface 204 may be a single interface (e.g., an output interface only to output reports to a printer 242), multiple interface (e.g., a graphical user interface 240 may be interactive and send and receive data over input/output interface 204), or a set of interfaces (e.g., to connect with multiple devices).

In one or more embodiments, computer-readable medium 210 stores instructions for execution by processor 208. In one or more embodiments, one or more applications stored on computer-readable medium 210 are implemented in software (e.g., computer-readable and/or computer-executable instructions) stored in computer-readable medium 210 and accessible by processor 208 for execution of the instructions.

Figure 3:
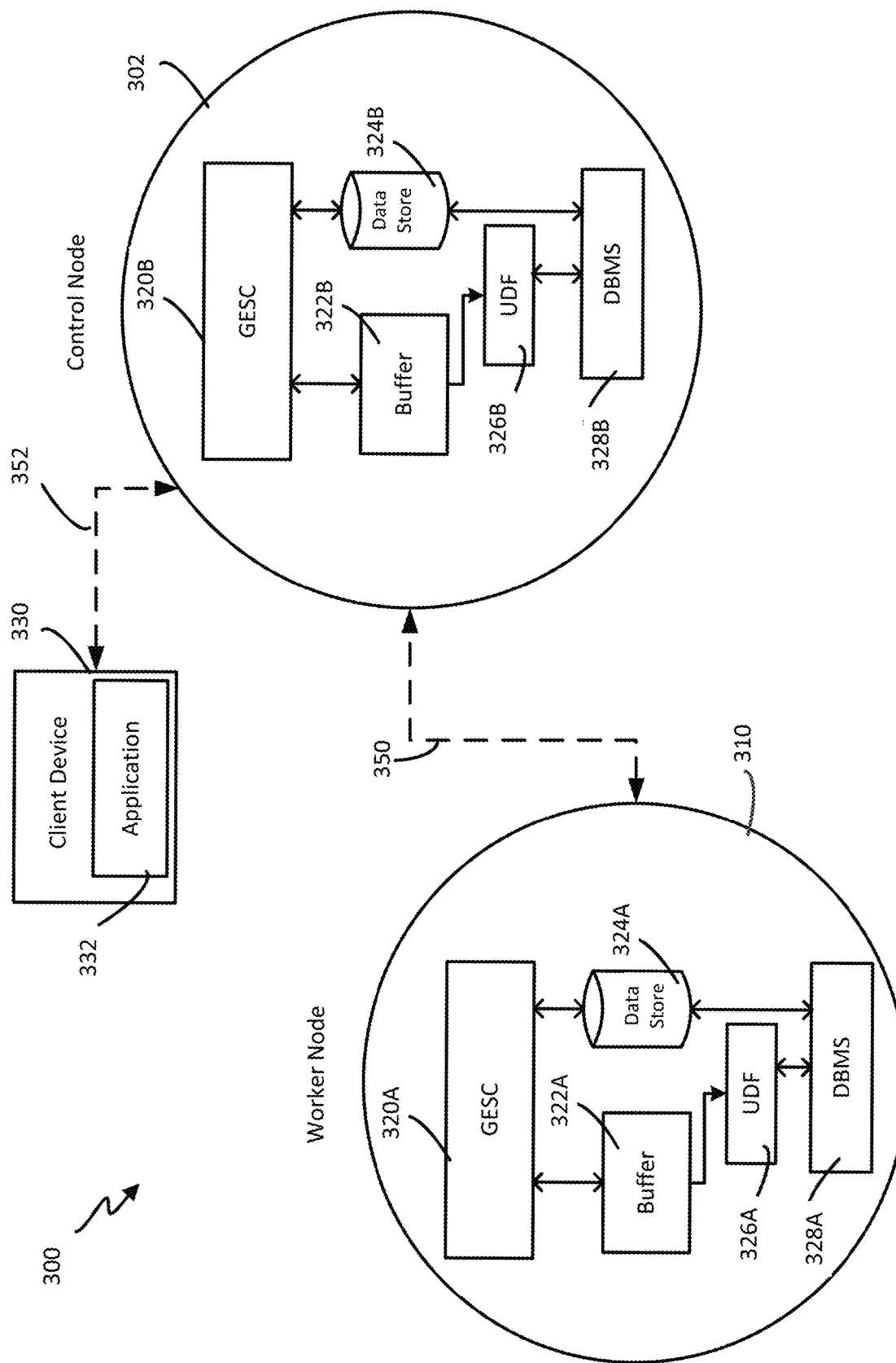
FIG. 3 illustrates a portion of a communications grid computing system, including a control node and a worker node, according to at least one embodiment of the present technology.

FIG. 3 illustrates a system 300 including a control node (e.g., pool manager 104 of FIG. 1) and a worker node (e.g., worker nodes 110 of FIG. 1), according to embodiments of the present technology. System 300 includes one control node (control node 302) and one worker node (worker node 310) for purposes of illustration but may include more worker and/or control node. The control node 302 is communicatively connected to worker node 310 via communication path 350. Therefore, control node 302 may transmit information (e.g., related to the session pool 102 or notifications), to and receive information from worker node 310 via path 350.

System 300 includes data processing nodes (e.g., control node 302 and worker node 310). Control node 302 and worker node 310 can include multi-core data processors. Each control node 302 and worker node 310 in this example includes a grid-enabled software component (GESC) 320 that executes on the data processor associated with that node and interfaces with buffer memory 322 also associated with that node. Each control node 302 and worker node 310 in this example includes a database management software (DBMS) 328 that executes on a database server (not shown) at control node 302 and on a database server (not shown) at worker node 310.

Each control node 302 and worker node 310 in this example also includes a data storage 324. Data storage 324, similar to network-attached data stores 120 in FIG. 1, are used to store data to be processed by the nodes in the computing environment. Data storage 324 may also store any intermediate or final data generated by the computing system after being processed, for example in non-volatile memory. However, in certain embodiments, the configuration of the system 300 allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the pool receives queries (e.g., ad hoc) from a client device 330 and when responses, which are generated by processing large amounts of data, need to be generated quickly or on-the-fly. In such a situation, the pool may be configured to retain the data within memory so that responses can be generated at different levels of detail and so that a client may interactively query against this information.

Each control node 302 and worker node 310 in this example also includes a user-defined function (UDF) 326. The UDF 326 provides a mechanism for the DBMS 328 to transfer data to or receive data from the database stored in the data storage 324 that are managed by the DBMS. For example, UDF 326 can be invoked by the DBMS 328 to provide data to the GESC 320 for processing. The UDF 326 may establish a socket connection (not shown) with the GESC 320 to transfer the data. Alternatively, the UDF 326 can transfer data to the GESC 320 by writing data to shared memory accessible by both the UDF 326 and the GESC 320.

The GESC 320 at the control node 302 and worker node 310 may be connected via a network. Therefore, control node 302 and worker node 310 can communicate with each other via the network using a predetermined communication protocol such as, for example, the Message Passing Interface (MPI). Each GESC 320 can engage in point-to-point communication with the GESC at another node or in collective communication with multiple GESCs via the network. The GESC 320 at each node may contain identical (or nearly identical) software instructions. Each control node 302 and worker node 310 may be configured to operate as either a pool manager or a worker node. The GESC 320B at the control node 302 can communicate, over a communication path 352, with a client device 330. More specifically, control node 302 may communicate with client application 332 hosted by the client device 330 to receive queries and to respond to those queries after processing large amounts of data.

DBMS 328 may control the creation, maintenance, and use of database or data structure (not shown) within control node 302 and worker node 310. The database may organize data stored in data storage 324. The DBMS 328 at control node 302 may accept requests for data and transfer the appropriate data for the request. With such a process, collections of data may be distributed across multiple physical locations. In this example, each control node 302 and worker node 310 stores a portion of the total data managed by the management system in its associated data storage 324.

Furthermore, the DBMS 328 may be responsible for protecting against data loss using replication techniques. Replication includes providing a backup copy of data stored on one node on one or more other nodes. Therefore, if one node fails, the data from the failed node can be recovered from a replicated copy residing at another node. Data or status information for each node in the session pool 102 may also be shared with each node on the pool.

Figure 4:
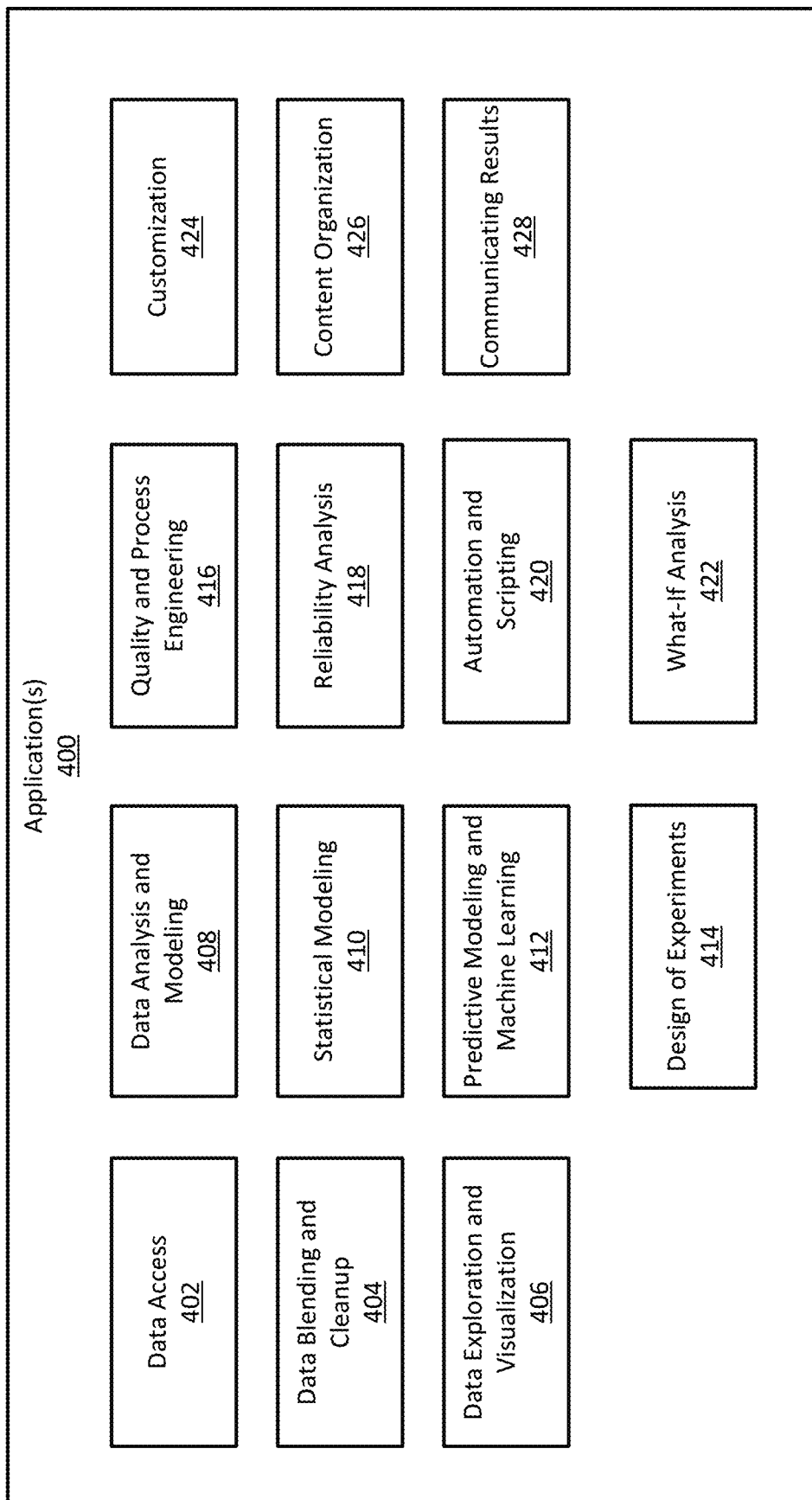
FIG. 4 illustrates a block diagram of example applications, according to at least one embodiment of the present technology.

FIG. 4 provides example applications 400 (e.g., applications executed by a computing device 202, worker node 310, or control node 302) for performing one or more tasks or operations.

For example, data access operations 402 can be used for accessing data from different sources (e.g., importing and/or reading Excel files, flat files, relational databases, APIs, R, Python, and SAS® files and databases). For instance, data can be imported for data visualization, exploration and analysis. Data can be formatted or optimized. For instance, data blending and cleanup operations 404 can be used to remove complexity (e.g., in text, images and functions data) and for screening data (e.g., screening data for outliers, entry errors, missing values and other inconsistencies that can compromise data analysis). This can be useful for visual and interactive tools. Data can also be transformed, blended, grouped, filtered, merged into a single table or into subsets, or otherwise arranged for a particular scenario.

In one or more embodiments, one or more applications 400 include data exploration and visualization operations 406 that can be used to support plot and profiler tools. For instance, plot tools can be used to create data plots (e.g., to plot data to spot patterns and patterns that do not fit a trend). Some example plots include bubble plots, scatter plots (matrix and 3D), parallel plots, cell plots, contour plots, ternary plots, and surface plots. Profilers are tools that can be used to create a specialized set of plots in which changing one plot changes the other plots. For instance, profiling is an approach to generate visualizations of response surfaces by seeing what would happen if a user changed just one or two factors at a time. Profiler tools can be used to create interactive profiles of data (e.g., to explore and graph data dynamically and uncover hidden relationships between graphed data or interface with linked data, to interpret and understand the fit of equations to data, and to find factor values to optimize responses). Some example profiler tools include prediction profiler, contour profiler, surface profiler, mixture profiler, custom profiler, and excel profiler. A prediction profiler can be used to show vertical slices across each factor, holding other factors at a current value. A contour profiler allows horizontal slices showing contour lines for two factors at a time. A surface profiler generates three-dimensional plots for two factors at a time, or contour surface plot for 3 factors at a time. A mixture profiler is a contour profiler for mixture of factors. A custom profiler is a numerical optimizer. An excel profiler allows for visualization of models or formulas stored in electronic worksheets. Accordingly, profiler tools can allow for one or more of simulation, surface visualization, optimization, and desirability studies. Graphs (e.g., from plot or profiler tools) can be exported to electronic or print reports for presenting findings. Further, data exploration and visualization operations 406 can include text exploration such as computer extraction of symbols, characters, words and phrases; or computer visualization such as to organize symbols, characters, words and phrases to uncover information regarding a text or classify the text.

In one or more embodiments, one or more applications 400 include data analysis and modeling operations 408 can be used to analyze one or many variables or factors in linked analysis. Analysis results may be linked with specific graphs designed for different types of data or metrics (e.g., graphs related to histograms, regression modeling and distribution fitting). Data analysis and modeling can be performed real-time (or just-in-time). For instance, applications 400 can included statistical modeling operations 410. For instance, statistical modeling operations 410 can be used for a diversity of modeling tasks such as univariate, multivariate and multifactor. Data can be transformed from its collected form (e.g., text or functional form) and data can be used for building models for better insights (e.g., discovery trends or patterns in data). As another example, one or more applications 400 can include predictive modeling and machine learning operations 412 to build models using predictive modeling techniques, such as regression, neural networks and decision trees. The operations 412 can be used to fit multiple predictive models and determine the best performing model with model screening. Validation (e.g., cross-validation and k-fold cross-validation) can be used (e.g., to prevent over-fitting or to select a best model). Machine learning methods can be used by the user without having to write code and tune algorithms. Examples of machine learning techniques are described in more detail with respect to FIGS. 5 and 6).

In one or more embodiments, one or more applications 400 include design of experiments (DOE) operations 414 used to create designs for experiments that provide test conditions for one or more factors tested in the experiment. For example, the design of experiments operations 414 can be used to create optimally designed experiments, efficient experiments to meet constraints, process limitations and budget, and/or screening designs to untangle important effects between multiple factors. DOE operations 414 can also be used for evaluating designs (e.g., design diagnostic measures such as efficiency metrics).

In one or more embodiments, one or more applications 400 include quality and process engineering operations 416 to track and visualize quality and processes. For instance, the quality and process engineering operations 416 can generate charts to explore root causes of quality or process problems (e.g., causes of variation in manufacturing processes and drill down into problem processes). Additionally, or alternatively, they can be used to generate notifications for metrics that exceed a threshold such as an out-of-control signal or a control chart warning. Additionally, or alternatively, they can be used to study the capability and performance of one or more variables to identify processes that are not meeting user-defined goals. Objective data from processes or consumer data can be used to release better products and react to market trends.

In one or more embodiments, one or more applications 400 include reliability analysis operations 418. For example, in manufacturing, reliability analysis tools can be used to prevent failure, improve warranty or product performance, find and address important design vulnerabilities, and pinpoint defects in materials or processes. Reliability analysis tools can also be used to determine how to reduce or improve these issues (e.g., by identifying trends and outliers in data and model predictions). What-if Analysis operations 422 can be used to demonstrate patterns of predicted responses and the effect of each factor on the response with scenario analysis. For example, a graphical user interface can be used for a user to put in different inputs, assumptions or constraints for a system and observe responses or effects. For instance, in a measurement system analysis analyzing whether parts would be in-specification, different estimated variances between parts and operators testing the parts could be varied to determine the effect on modeled output for the measurement system analysis.

In one or more embodiments, one or more applications 400 include automation and scripting operations 420. For example, automation can allow code-free access for a user to automation routines all the way up to completely customized applications (e.g., code free access to SAS®, MATLAB®, PythonR and R routines). For example, a design created for experiments can be automated such that automatic testing is performed for the design.

In one or more embodiments, one or more applications 400 include operations for greater user control and interaction. For instance, customization operations 424 can be used for user customization (e.g., mass customizations, and customizations of graphics, statistics, and default views). As another example, content organization operations 426 can be used to organize data (e.g., translate statistical results to a simplified view to communicate findings and organize, summarize, and document content to better aid the accountability and reproducibility of projects). As another example, the communicating results operations 428 can be used for presentation of results, models, or other output from one or more applications 400 (e.g., presented in print, graphical user interface, or web-based versions).

In one or more embodiments, fewer, different, and additional components can be incorporated into computing device 202. In one or more embodiments, the input/output interface has more than one interface that uses the same or different interface technology.

In one or more embodiments, the one or more applications 400 can be integrated with other analytic or computing tools not specifically shown here. For instance, one or more applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Figure 5:
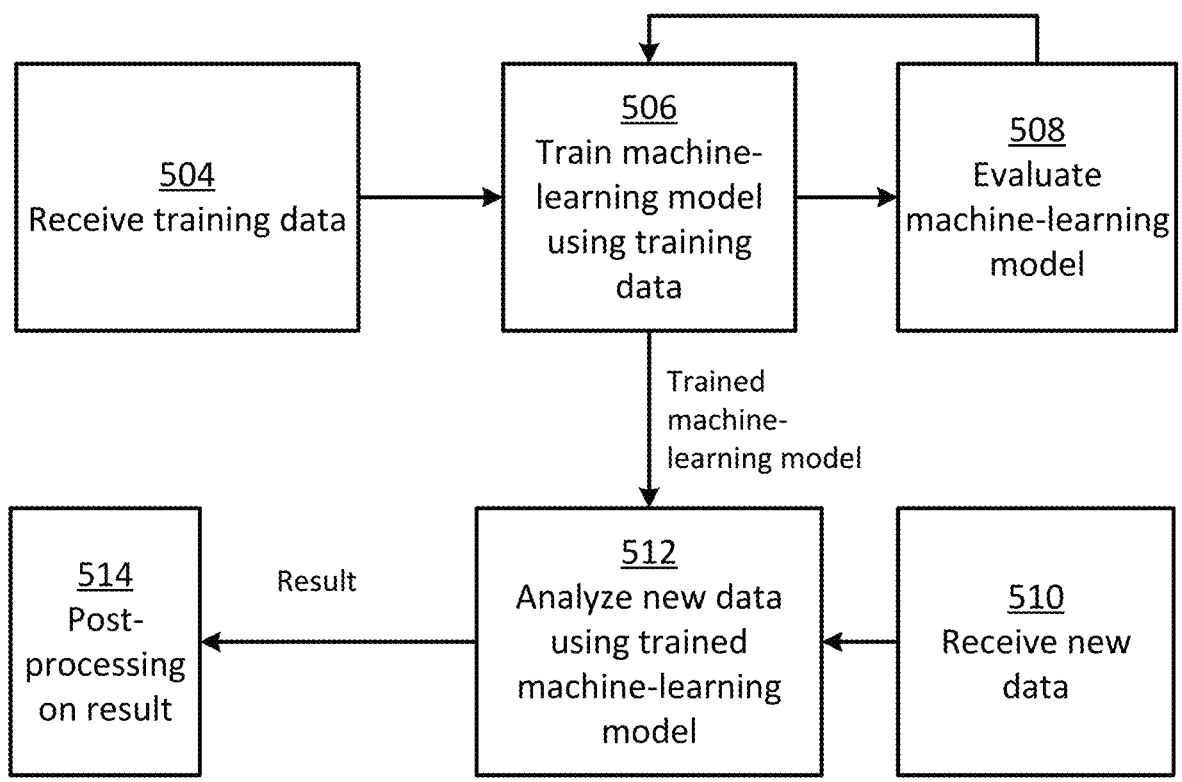
FIG. 5 illustrates a flow chart of an example of a process for generating and using a machine-learning model, according to at least one embodiment of the present technology.

One or more embodiments are useful for generating and using machine-learning models. FIG. 5 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models construction can be at least partially automated (e.g., with little or no human involvement) in a training process. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 504, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 512, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
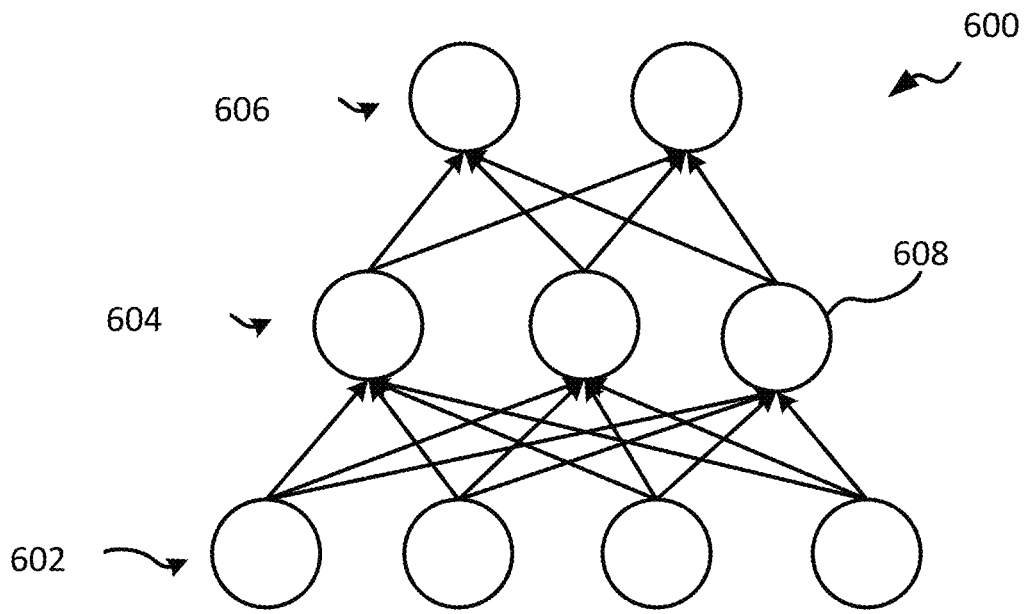
FIG. 6 illustrates an example of a machine-learning model as a neural network, according to at least one embodiment of the present technology.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600. In some examples, the neural network 600 can be trained using backpropagation.

Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, o)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the session pool 102 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, chip-level thermal processing considerations, processing speed improvements, data communication speed improvements, and/or data efficiency targets and improvements throughout various parts of the system when compared to a homogeneous computing architecture that employs CPUs for general purpose computing.

Associated Processes

Method for Applying an Estimated True Unit Distribution in Binning Classification Error Mitigation FIG. 7 illustrates one embodiment of a method 1400 for computationally generating an estimated true unit distribution at least to enhance binning classification accuracy using metrology that may have variability in measurements. Method 1400 preferably includes obtaining an input of a measured unit distribution in process 1402, obtaining characteristics of a measurement device in process 1404, obtaining an input of a type of distribution in process 1406, computing an estimated true unit distribution in process 1408, and using quantitative characteristics of the estimated true unit distribution to mitigate binning classification error in process 1410. It will be appreciated that other embodiments contemplated within the scope of the present disclosure may involve more operations, fewer operations, different operations, or a different order of operations than as shown in FIG. 7.

It shall be recognized that other embodiments within the scope of the present disclosure may involve more operations, fewer operations, different operations, or a different order of operations than as shown in FIG. 7.

Obtaining Measured Unit Distribution Input

In one or more embodiments, method 1400 may include process 1402. Process 1402, which may include obtaining an input of a measured unit distribution, may function to obtain, via a graphical user interface (GUI), an input of a measured unit distribution derived from measurements by a measurement device of a plurality of instances of a physical unit. The measured unit distribution, in such embodiments, may represent a distribution of measurements taken by the measurement device across a plurality of instances of the physical unit during one or more steps in a production process, a quality assessment process, delivery process, and/or the like of the instances of the physical unit. The GUI may enable a user to input the measured distribution data, which may include a plurality of data points representing values measured across instances of a physical unit. Accordingly, the measured unit distribution obtained in process 1402 may capture the variability and characteristics of the instances of the physical unit as observed by the measurement device during a measurement process. It shall be recognized that the input of the measured unit distribution may form the basis for further processing, as described with respect to various processes and steps of the present disclosure, including but not limited to forming a basis upon which an estimated true unit distribution may be computed.

Figure 9A:
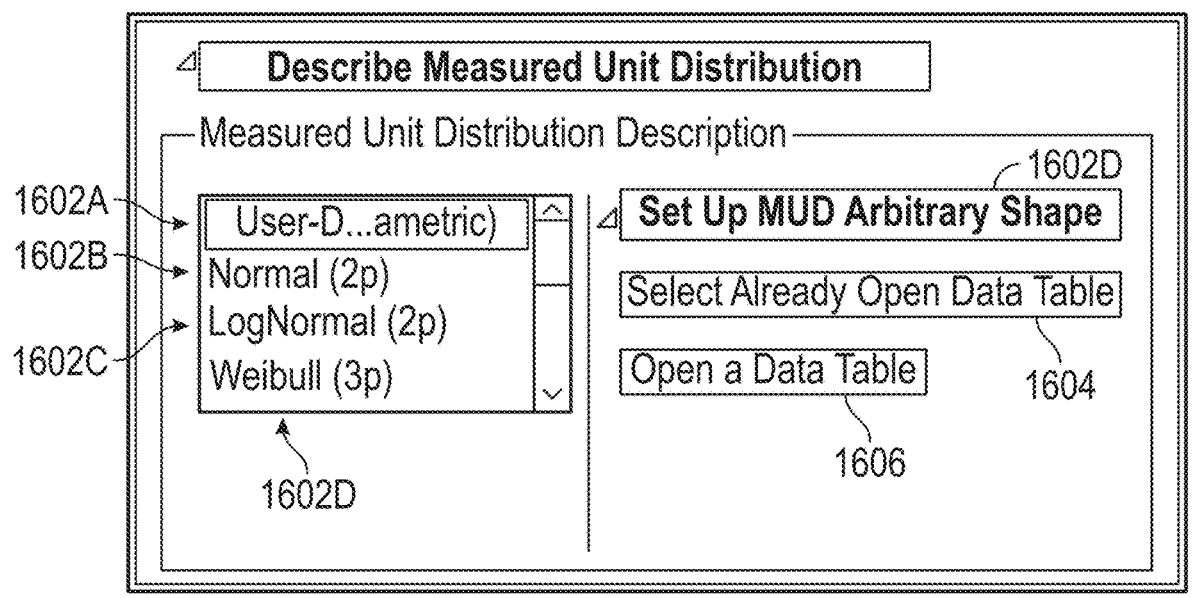
FIG. 9A illustrates an example graphical user interface for obtaining input for defining a measured unit distribution, according to at least one embodiment of the present technology.

Additionally, or alternatively, the measured unit distribution may be provided as input in various formats, using any suitable data structure, such as a data table, probability density function, discrete data points, histogram, or other statistical representations that may accurately contain the measurements recorded by the measurement device of the instances of the physical unit. By way of example of an exemplary GUI for obtaining measurement unit distribution data, FIG. 9A illustrates several GUI objects, including input object 1604 that, when selected by a user, enables a user to provide measurement unit distribution data from an open data table and another input object 1606 that, when selected by the user, enables the user to provide measurement distribution data by opening a data table containing the relevant unit distribution data.

Figure 9B:
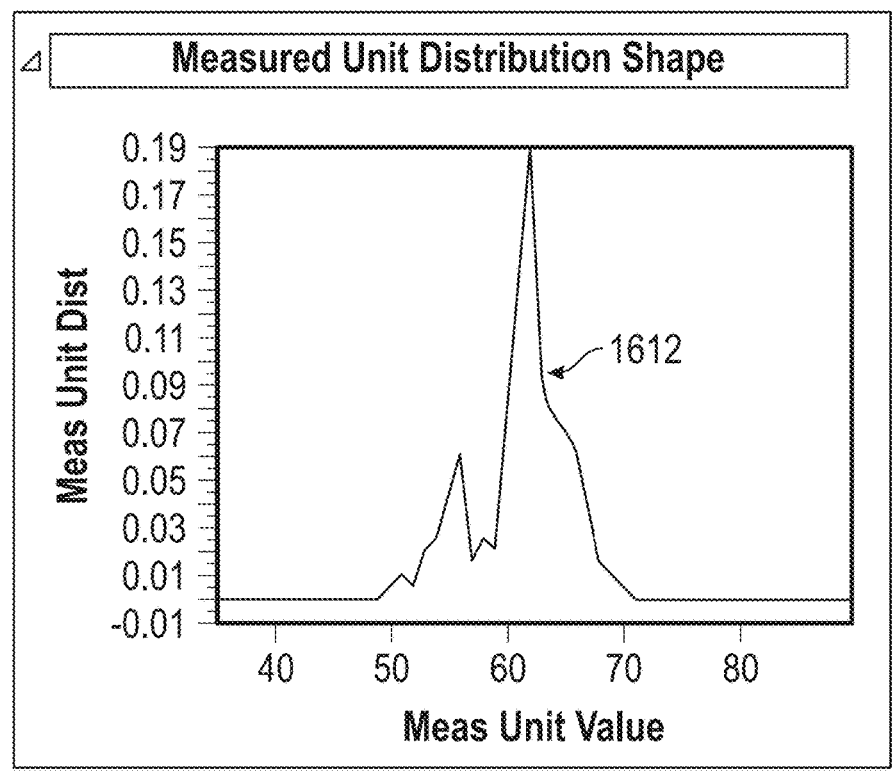
FIG. 9B illustrates an example graphical user interface displaying a measured unit distribution, according to at least one embodiment of the present technology.

As depicted in FIG. 9B, the measured unit distribution data may be presented graphically, with measured unit values plotted along the x-axis against the frequency or density of units along the y-axis. The visualization of the measured unit distribution may aid in identifying key characteristics, such as the central tendency and variability of the measured data, providing a foundation for further analysis and accurate computation of the estimated true unit distribution.

In some embodiments, an input associated with the measured unit distribution may also include metadata associated with the measurement process including, but not be limited to, timestamps, measurement conditions, specific calibration data related to the measurement device, and/or the like. In some embodiments, the GUI may provide control elements or GUI objects (not shown) that allow a user to select different data visualization options, adjust a range of measurement values, or specify the granularity of the input data (e.g., the number of bins in a histogram or the like).

In one or more embodiments, receiving the input of the measured unit distribution may be facilitated via a user interface, such as the GUIs exampled in FIG. 9A through FIG. 11B of the present disclosure. As described with more details herein, an example GUI may include elements 1602B through 1602D to enable a user to provide input relating to the measured unit distribution.

Obtaining Characteristics of Measurement Device Input

In one or more embodiments, method 1400 may include process 1404. Referring to FIG. 10, process 1404 involves obtaining, via a GUI, input regarding the characteristics of the measurement device used in measuring a plurality of instances of the physical unit. The GUI illustrated in FIG. 10 includes a data input section 1702 including bias input section 1702A, standard deviation input section 1702B, and linear coefficient input section 1702C, where users can define gauge performance characteristics by entering values for bias, standard deviation, and optionally, linear coefficients affecting the relationship between gauge readings and true unit values. The GUI further includes graphical representations that provide immediate feedback on how these inputted characteristics influence measurement accuracy, enabling targeted adjustments and ensuring that the measurement device's characteristics are accurately captured. The characteristics of the measurement device may inform one or more potential sources of error or variation in the measured unit distribution obtained in process 1402. Accordingly, process 1404 may enable through method 1400 the setup of the parameters required for accurately deriving the estimated true unit distribution.

In one or more embodiments, the input of the plurality of characteristics of the measurement device may include, but should not be limited to, variance, bias, range, resolution, repeatability, and linearity attributes of a subject measurement device. Other characteristics, such as precision, accuracy, error rate, and other relevant technical specifications of the measurement device may be collected as input via the GUI.

The variance characteristics of the measurement device, as referred to herein, preferably relates to an inherent variability in measurements made by the measurement device that may affect an accuracy of the measurements. An input of a variance characteristic of the measurement device may include an input of one or more standard deviation values identifying a measure of an amount of variation of the measured values of the instances of the physical unit about a mean of the measured values. A bias characteristic of the measurement device, as referred to herein, preferably relates to any systematic error or deviation in the measurements introduced by the measurement device that may cause the measured values of the instances of the plurality of physical units to consistently differ from the true measurement values of the instances of the physical units. A linearity characteristics of the measurement device, as referred to herein, preferably relates to a degree to which the measurement device responds to changes in the characteristics of the instances of the physical unit is consistent across the measurement range. As such, linearity characteristics may also include non-linear behaviors that might affect the measurement accuracy at different points in the measurement range. Calibration data associated with the measurement device, as referred to herein, preferably relates to data related to a calibration of the measurement device, which may include specific settings, calibration coefficients, adjustment parameters used to align the measurements of the measurement device with known or predetermined standards. Additionally, range characteristics, as referred to herein may specific the upper and lower limits within which the measurement device may accurately measure, and a resolution characteristic may refer to the smallest increment the measurement device may distinguish. A repeatability characteristic may relate to an ability of the measurement device to provide a same measurement result under consistent or similar environmental or measuring conditions.

Additionally, or alternatively, the GUI may be configured to provide a user with various input fields, dropdown menus, or selectable options to enter or select characteristics data associated with the measurement device. In one or more embodiments, receiving the input of the characteristics of the measurement device may be facilitated via a user interface, such as the GUI exampled in FIG. 10 of the present disclosure. As shown in FIG. 10, an example GUI may include data input section 1702 to enable a user to provide input relating to characteristics of the measurement device. Additionally, or alternatively, process 1404 may automatically retrieve characteristics of the measurement device from a pre-configured database or the like based on the type or model of the measurement device identified by a user.

It shall be recognized that the characteristics of the measurement device obtained in process 1404 may provide inputs for subsequent processes and/or computation steps described herein that affect an accuracy and reliability of an estimated true unit distribution. For instance, if the measurement device exhibits bias or variance, the computation of the estimated true unit distribution takes into account values associated with bias or variance to ensure that an accurate distribution for instances of a physical unit may be applied in one or more downstream applications, including, but not limited to, accurately classifying the physical units to one or more bins in view of erroneous or variant measurements of a given measurement device.

Therefore, at least one technical advantage of process 1404 includes obtaining accurate and comprehensive input relating to the characteristics of the measurement device and/or measurement conditions that enables method 1400 to model the measurement process more precisely, leading to improved error mitigation and more reliable estimate of the true unit distribution. Accordingly, incorporating these measurement device characteristics of the measurement device into method 1400 ensures that any deviations in the measurement data of the physical units may be appropriately adjusted or corrected, enhancing the overall robustness and validity of the subsequent distribution estimation and error mitigation processes.

Obtaining Distribution Type Input

Figure 11A:
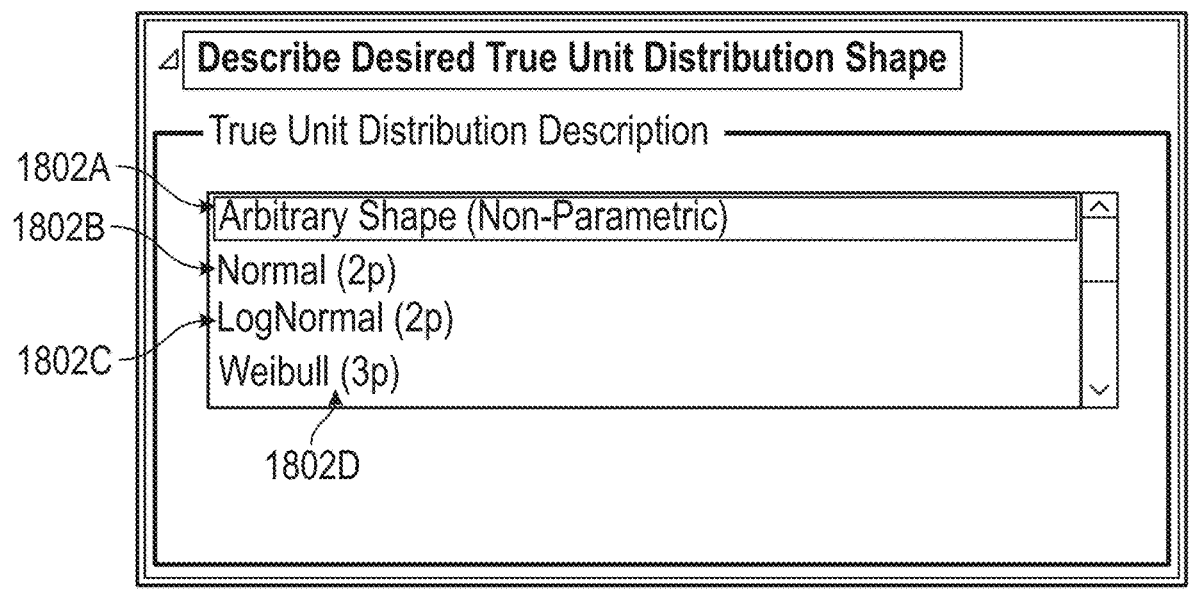
FIG. 11A illustrates an example graphical user interface for obtaining input for defining a shape of a true unit distribution, according to at least one embodiment of the present technology.

In one or more embodiments, method 1400 may include process 1406. Process 1406 which may include obtaining an input of a type of distribution, may function to obtain via a GUI an input of a type of distribution for fitting a set of measurement values of the physical unit to a target distribution. As shown in FIG. 11A, process 1406 allows a user to specify, via a GUI, the type of distribution for fitting the set of measurement values of the physical unit to a target distribution. The GUI depicted in FIG. 11A prominently features a dropdown menu labeled 1802A, allowing the user to select from a plurality of types of distributions, including "Normal," "LogNormal," "Weibull," or "Arbitrary Shape (non-parametric)," depending on the nature of the measurement data. That is, in such embodiments, process 1406 enables a user to define a manner in which measured data sourced from the measurement device may be analyzed and interpreted by specifying the type of distribution to be used in a distribution fitting process for the set of measurement values.

As mentioned above, via process 1406, the user may select from a plurality of types of distributions, including but not limited to, normal distribution, log-normal distribution, Weibull distribution, exponential distribution, gamma distribution, or a user-defined non-parametric distribution. Each type of distribution has unique characteristics and parameters that influence the shape and behavior of the distribution model applied to the measured unit data. For instance, a normal distribution assumes a symmetric, bell-shaped curve, whereas a Weibull distribution may be more suitable for modeling life data with a distinct skewness.

In one or more embodiments, an input may specify a type of distribution including, but should not be limited to, a parametric distribution, such as normal, log-normal, Weibull, gamma, or exponential, as well as non-parametric or arbitrary-shaped distributions that provide flexibility in modeling measurement data sourced from the measurement device.

Additionally, the GUI may prompt the user to input parameters corresponding to the selected type of distribution. For a normal distribution, these parameters may include the mean (u) and standard deviation (o), while a Weibull distribution may require shape and scale parameters. For a non-parametric distribution, the user may input discrete data points or provide a custom function that defines the distribution shape.

Process 1406 further includes validating the input type of distribution and associated parameters to ensure compatibility with the measured unit data. If any discrepancies or inconsistencies are detected between the selected type of distribution and the characteristics of the measured unit data, the system may generate an alert or provide recommendations for alternative types of distributions or parameter adjustments.

By obtaining the input of a type of distribution, process 1406 facilitates the subsequent estimation of the true unit distribution in process 1408. The selected type of distribution provides a mathematical model that guides the transformation of the measured unit data into an estimated true unit distribution, thereby improving the accuracy and reliability of the classification and binning processes described in process 1410.

In a non-limiting example, in circumstances in which characteristics of the physical units measured by the measurement device may be expected to follow a non-standard distribution shape, a user may select an arbitrary or user-defined distribution. In such example, if the measurement data exhibits unique patterns or irregularities, such as those encountered in advanced manufacturing processes or research and development environments, process 1406 flexibly supports inputs specifying non-parametric distributions that enable a more accurate modeling of the unique patterns or irregularities of the measurement data.

Computing an Estimated True Unit Distribution

In one or more embodiments, method 1400 may include process 1408. Process 1408, which may include computing an estimated true unit distribution, may function to compute via a unit distribution estimation algorithm the estimated true unit distribution of the plurality of instances of the physical unit. Additionally, or alternative, process 1408, in view of FIG. 8, involves using a unit distribution estimation algorithm 1506 to compute the estimated true unit distribution. Unit distribution algorithm 1506 integrates inputs from processes 1402, 1404, and 1406, and applies error correction techniques to account for systematic and random errors in the measurement data. The computed estimated true unit distribution is further visualized using the estimated TUD module 1512, providing a graphical representation of the adjusted data, ensuring that the computed estimated true unit distribution accurately reflects the true characteristics of the measured physical units.

In a preferred embodiment, the computation of the estimated true unit distribution may include providing, as input, outputs of processes 1402, 1404, and 1406 into unit distribution estimation algorithm 1506. As such, process 1408 includes computing an estimated true unit distribution based on inputs of the measured unit distribution obtained in process 1402, the characteristics of the measurement device obtained in process 1404, and the type of distribution obtained in process 1406. In response to obtaining the above-mentioned inputs, process 1408 transforms the measured unit distribution data, which inherently includes measurement errors, into the estimated unit distribution representing an accurate representation of the actual or "true" distribution of the physical units.

The estimated true unit distribution may be computed in process 1408 by applying a series of corrective algorithms of unit distribution algorithm 1506 that consider the various errors and biases associated with the measurement device. The various errors may include, but should not be limited to, systematic errors such as bias and linearity errors, as well as random errors like variance due to measurement noise. In one or more embodiments, process 1408 uses the input characteristics of the measurement device (e.g., bias, variance, linearity) to adjust the measured unit distribution, accordingly. In one or more embodiments, process 1408 may include executing unit distribution estimation algorithm 1506 to adjust the measured unit distribution (provided as input in process 1402) to account for the characteristics of the measurement device, such as a variance, bias, and linearity of the measurement device. In such embodiments, the adjustments to the measured unit distribution by unit distribution estimation algorithm 1506 may correct distortions introduced during the measurement process by the measurement device thereby ensuring that the estimated true unit distribution accurately represents true characteristics of the measured physical units.

Additionally, or alternatively, in response to one or more adjustments of the measurement data of the measured unit distribution, unit distribution algorithm 1506 may function to fit the adjusted measurement data to the selected type of distribution (of process 1406). In such embodiments, unit distribution algorithm 1506 may include executing one or more error optimization techniques including, but not limited to, minimizing the sum of squared errors between the observed measurement data of the measured unit distribution and theoretical data of a theoretical distribution model associated with the selected type of distribution. The computation of process 1408 may begin by initializing unit distribution estimation algorithm 1506 with the selected type of distribution (e.g., normal, log-normal, Weibull, exponential, gamma, or non-parametric) as an initial parameter or starting parameter. Once initialized, unit distribution estimation algorithm 1506 may process the measured unit distribution to align it with the selected type of distribution, applying corrections for any identified measurement errors. For example, if the measurement device has a known bias, the algorithm compensates for the known bias by shifting the measured distribution accordingly.

Accordingly, the execution of unit distribution algorithm 1506 may include employing an iterative optimization technique, which may be part of the unit distribution algorithm 1506, for iteratively adjusting parameters, such as the sum of squared errors (e.g., least squares minimization), of the emerging estimated true unit distribution until a fitness condition or the like (e.g., best possible fit of adjustment measurement data to the selected distribution) is satisfied by values of one or more of the parameters of the emerging estimated true unit distribution. That is, process 1408 may function to apply the iterative optimization technique to repeatedly adjust the parameters of the selected type of distribution (e.g., mean and standard deviation for a normal distribution) until the estimated true unit distribution converges to a stable solution that minimizes the difference between the corrected or adjusted measured data and the theoretical distribution model.

Resultantly, process 1408 may function to produce an estimated true unit distribution that may closely approximate an actual distribution of characteristics of the instances of the physical units measured by the (faulty or errant) measurement device. The estimated true unit distribution, in such embodiments, may include a representation of the measurements of the instances of the physical unit with mitigated distortions and/or inaccuracies derived from the measurement device.

Figure 11B:
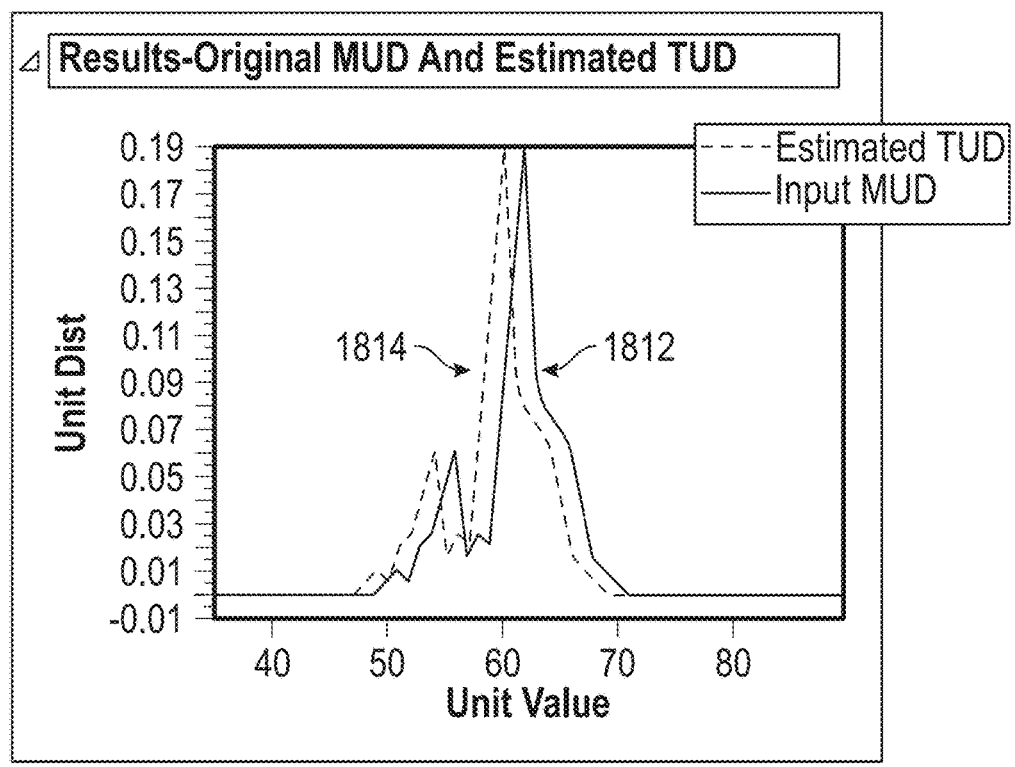
FIG. 11B illustrates an example graphical user interface displaying a measured unit distribution and an estimated true unit distribution, according to at least one embodiment of the present technology.

As shown in FIG. 11B, in some embodiments, process 1408 may generate, via a GUI, a graphical representation of the estimated true unit distribution 1814 alongside a graphical representation of the measured unit distribution 1812, providing a user with a visual confirmation of the accuracy of the computed estimated true unit distribution. While not shown, GUI may also display metrics such as residual sum of squares (RSS) or goodness-of-fit measures to further assist in evaluating the validity of the estimated distribution. It shall be recognized that process 1408 may output the representation of the estimated true unit distribution 1814 in various forms including, but not limited to, data tables, graphs, and/or statistical summaries.

Accordingly, the estimated true unit distribution as generated in process 1408 may be provided as a reference and/or quantitative characteristics of the estimated true unit distribution used as input, particularly, in process 1410, in which attributes of the estimated true unit distribution may be used to create simulations for decisioning on calibrated specification limit values and/or to mitigate binning classification errors derived from an errant measurement system or errant processes when evaluating a quality of instances of a physical unit. As such, in one or more embodiments, an accurate modeling of the estimated true unit distribution using the measured distribution data may enable an effective generation of calibrated specification limits, thereby enhancing the reliability and precision of the classification and decision-making processes for measured instances of a physical unit within a measurement environment having a variable or errant measurement device or measurement system.

Mitigating Binning Classification Error|Binning Simulations

In one or more embodiments, method 1400 may include process 1410. Process 1410 includes using the quantitative characteristics of the estimated true unit distribution, as computed in process 1408, to mitigate binning classification errors that may occur when classifying or categorizing physical units based on errant or faulty measurement data. Process 1410 employing the analytical task application 1514 in FIG. 8 may use estimated true unit distribution 1512 and/or quantitative characteristics of the estimated true unit distribution 1508 to generate calibrated specification limits, dynamically adjust binning criteria to reduce false positives rates and false negative rates, and/or generate simulations to visualize an impact of varying values of the calibrated specification limits. Quantitative characteristics of the estimated true unit distribution 1508 may include parameters such as mean, variance, standard deviation, skewness, and kurtosis, among others, depending on the type of distribution selected in process 1406. The parameters of the quantitative characteristics of the estimated true unit distribution 1508 may provide a mathematical and/or analytical description of the estimated true unit distribution, allowing for precise calibration of classification thresholds or binning criteria (e.g., calibrated specification limits).

Additionally, or alternatively, process 1410 may include determining calibrated or optimal specification limits that may be used as thresholds for binning entities or physical units that have been measured based on analyzing and using characteristics of the estimated true unit distribution to derive the calibrated specification limits. In one or more embodiments, objectives of process 1410 may include minimizing type I errors (i.e., false positive rates, where a unit is incorrectly classified as meeting a specification) and type II errors (i.e., false negative rates, where a unit is incorrectly classified as failing a specification). A mitigation of type I and/or type II errors may be achieved in process 1410 by dynamically adjusting the binning criteria for measured instances of a physical unit based on quantitative characteristics of the estimated true unit distribution 1508.

As such, in one or more embodiments, process 1410 may utilize the quantitative characteristics derived from the estimated true unit distribution to compute one or more calibrated specification limits, i.e., calibrated upper and calibrated lower specification limits. A calibrated specification limit, as referred to herein, preferably refers to a threshold value that is a modification of a previously-provided specification limit or the like, which accounts for measurement errors identified during the computation of the estimated true unit distribution. It shall be recognized that the previously-provided specification limits may originate from various sources, including, but not limited to, a user-defined input, a database, a third-party source, a reference source, or may be a predetermined or pre-existing value established based on historical data, industry standards, or regulatory guidelines. For example, the specification limits could be set by a user based on specific quality control requirements, retrieved from a database that stores optimal production parameters, or sourced from a third-party entity such as a standards organization or supplier. Accordingly, in one embodiment, process 1410 may compute a calibrated specification limit based on the metrology error associated with the plurality of characteristics of a subject measurement device. Specifically, in such embodiments, process 1410 computes a calibrated specification limit based at least in part on calculating one or more distribution difference values (e.g., metrology-based error values) between the measured unit distribution and the estimated true unit distribution. In one or more embodiments, the one or more distribution difference values may represent error introduced in the measurement of a set of physical units by an errant measurement device or errant metrology that was utilized in the measurement process.

In one or more embodiments, the determination of the one or more calibrated specification limits based on the quantitative characteristics of the estimated true unit distribution, as determined in process 1408, may allow for encoding these calibrated specification limits into one or more automated controllers of a computerized binning classification system, as an additional step in process 1410. The calibrated specification limits, which account for measurement errors and device-specific variations, may be programmed into the controllers to ensure that each instance of a physical unit is accurately routed to a specific bin within a plurality of distinct bins. This process enhances the reliability and precision of the automated binning classification and/or routing system, reducing the risk of misclassification that may arise from uncorrected metrology errors.

Additionally, or alternatively, the automated controllers may use the encoded calibrated specification limits to compute a binning classification for each instance of the physical unit after determining a measurement for each physical unit. The binning classification may be based on the measurement characteristics of each physical unit and the comparison of the measurement characteristics to the calibrated specification limits. By dynamically adjusting the binning criteria according to the calibrated specification limits, the automated binning classification system ensures that physical units that conform to the corrected specification parameters are routed to the appropriate bins, thereby optimizing the production process and minimizing waste due to inaccurate measurements by the measurement device. This automated binning approach utilizes the quantitative characteristics data derived from the estimated true unit distribution to make real-time decisions, improving throughput and quality control in manufacturing environments.

Moreover, the integration of the calibrated specification limits into the automated controllers enables continuous adaptation and self-calibration of the automated binning classification system. As new data is received and analyzed, the automated binning classification system can update the calibrated specification limits to reflect any changes in measurement conditions, device performance, or production requirements. This adaptive capability provides a technical advantage by ensuring that the classification criteria remain aligned with the current state of the measurement environment, thereby maintaining consistent product quality and operational efficiency.

Process 1410, in a preferred embodiment, may function to adapt or change one or more of an upper specification limit value and a lower specification limit value, which may have been provided by a customer or other suitable pre-existing source of specification limits, to reduce and/or increase one or more of the upper specification limit value and the lower specification limit value using the one or more distribution difference values (i.e., quantitative characteristics derived from the estimated true unit distribution). In this way, process 1410 may function to ensure that the calibration of the specification limits compensates at least for measurement errors, thereby aligning the specification limits that are actually used in a binning process more closely with an actual, rather than errant, measurement performance and true distribution of a given set of physical units. Accordingly, the calibrated specification limits (e.g., an upper calibrated specification limit and a lower calibrated specification limit), when applied to the measurement values produced by the errant measurement device, may not necessarily the output values of the measurement device but shifts upper and/or lower specification limits to measurement error-adjusted values that may function to mitigate errors in classifying subsets of the given set of physical units to one or more conformant bins for physical units that satisfy the calibrated specification limits and to one or more non-conformant bins for physical units that do not satisfy the calibrated specification limits.

The calibrated specification limit(s), in one or more embodiments, may be employed along with or alongside previously-provided specification limits in a manner that enables binning classification of a given set of instances of a physical unit being measured by a faulty measurement device to be classified based on calibrated binning thresholds set according to one or more values of the calibrated specification limits.

In such embodiments, the calibrated specification limit(s) may be encoded to or programmed to, one or more binning routing or unit classification systems or components (e.g., computer processors configured to make automated routing decisions, routing modules, and/or the like) to function as the operational binning limits or runtime binning limits, in lieu of previously-provided specification limits or externally-derived specification limits, used to classify each measured instance of a physical unit of the given set of physical units to an accurate bin of a plurality of distinct bins. Moreover, it shall be recognized that in such cases, the calibrated specification limits while operating as the de facto specification limits that may be used, during a measuring or binning process, for generating a decision on a classification bin for a measured instance of a physical unit, the previously-provided specification limits may remain the de jure specification limits that may be referenced or used to derive calibrated specification values but not directly used for generating a decision on a classification bin.

Binning Simulations for Selecting Calibrated Specification Limits

Additionally, or alternatively, process 1410 may utilize quantitative characteristics of the estimated true unit distribution 1508 to initialize one or more computer simulations with simulation values and enable the generation of one or more computer simulations that visually and statistically demonstrate an impact to performance metrics of a unit measurement or (errant) assessment system or process based on varying or setting different values of the calibrated specification limits or calibrated binning thresholds for instances of a physical unit.

Figure 12:
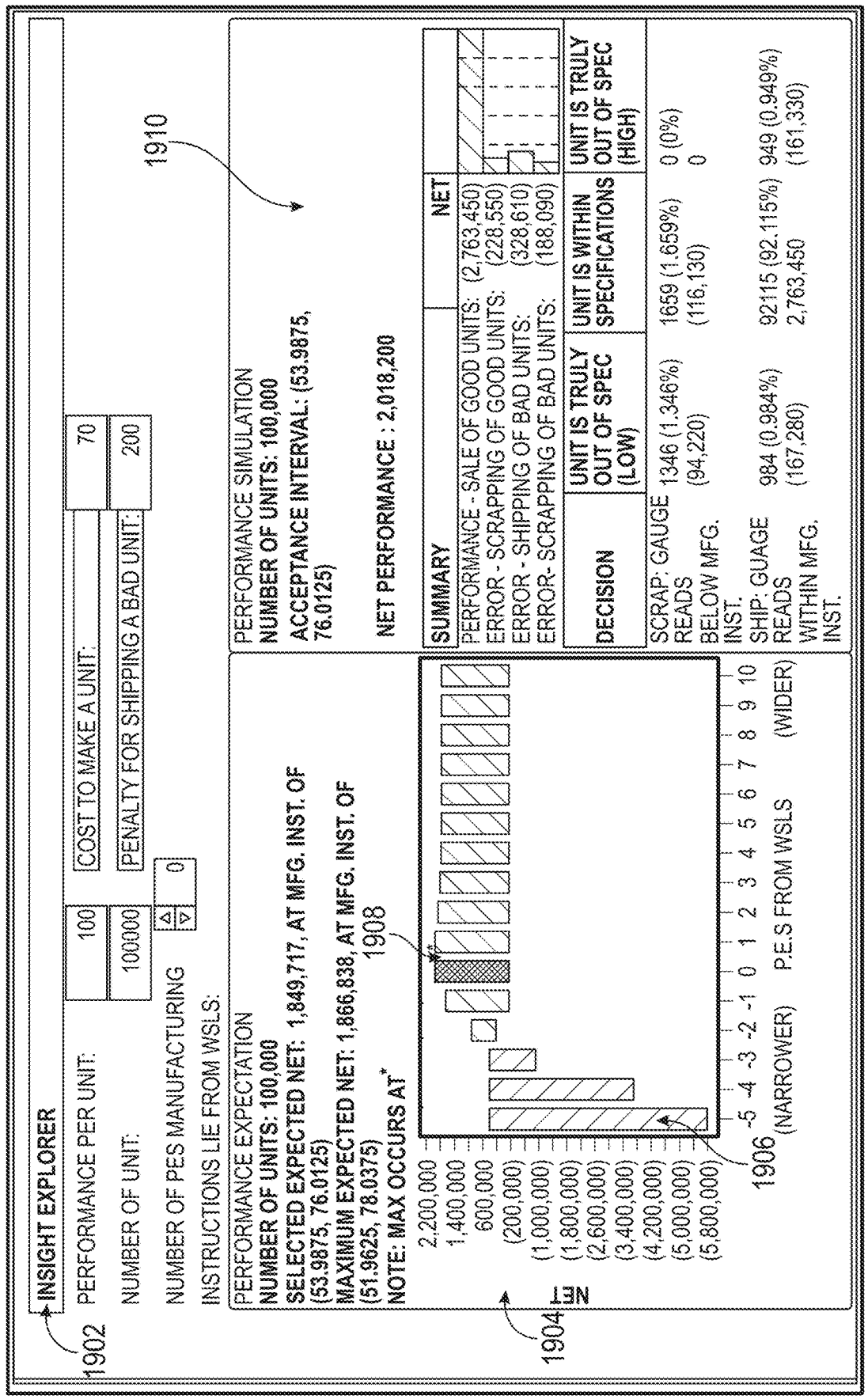
FIG. 12 illustrates an example interactive graphical user interface generating simulations by selectively using calibrated specification limits, according to at least one embodiment of the present technology.

Referring to FIG. 12, in some embodiments, the one or more computer simulations generated in process 1410 may function to enable an identification of likely binning classification errors or binning classification error values, as shown in GUI section 1902, under various measurement scenarios in which the specification limits are adjusted or selected differently in each scenario to produce one or more aspects of the computer simulations. In a non-limiting example, one or more scenarios may be initialized by selecting or manipulating one or more elements in GUI section 1904 with one or more calibrated specification limits to generate computer simulations that identify changes of a false positive rate associated with an incorrect classification of a subset of given instances of a physical unit to a bin for conforming units of a plurality of distinct bins. In yet another non-limited example, one or more scenarios may be initialized with one or more calibrated specification limits to generate computer simulations that identify changes of a false negative rate associated with an incorrect classification of a subset of given instances of a physical unit to a bin for non-conforming units of a plurality of distinct bins. Accordingly, the computer simulations generated according to various scenarios in process 1410 may enable a dynamic and adaptable approach to tuning or calibrating specification limits in view of the quantitative characteristics of an estimated true unit distribution 1508 for a set of physical units, thereby continuously improving classification accuracy of a given measurement system and/or measurement process based on real-world measurement data and user input.

Additionally, or alternatively, process 1410 preferably includes configuring and/or programming a simulator that enables enhanced measurement accuracy and reduce classification errors through advanced simulation capabilities. In one embodiment, process 1410 includes receiving inputs of a plurality of characteristics of the measurement device into the simulator, where the simulator comprises specially encoded memory and computer processors operably linked to a graphical user interface. The simulator, in such embodiments, may be further configured with parameters derived from the quantitative characteristics of the estimated true unit distribution, facilitating dynamic simulations to predict binning classification errors at dynamically determined or user-selected specification limits.

In one or more embodiments, the simulator may execute one or more simulations that evaluate the probabilities of binning classification errors under different measurement scenarios and/or calibrated specification limits. The simulations may account for variations in both the measurement device and the measuring process, allowing users to manipulate attributes such as device variability and process parameters through the graphical user interface, as shown by way of example in FIG. 13. As shown by reference to FIG. 12, process 1410 may additionally include interactive simulation outputs that visualize the potential misclassification outcomes. In such embodiments, the simulator aids in identifying optimal specification limits that minimize error rates and enhance the overall accuracy of unit classification within a manufacturing environment.

Additionally, the simulator may be specially configured and/or designed to display interactive user interface elements based on the outputs of the simulations. The interactive user interface elements may include graphical artifacts representing the distributions of measurement device and process variations, providing users with real-time feedback on the impact of their adjustments based on one or more interactive inputs by the user to one or more aspects of the simulation outputs. As a technical benefit, the dynamic and responsive nature of the simulator supports informed decision-making regarding specification limit settings for configuring a computerized automated unit classification and/or routing system, ultimately contributing to reduced waste, increased production efficiency, and improved alignment of measured outcomes with characteristics of the estimated true unit distribution.

Additionally, or alternatively, in some embodiments, method 1400 may include a feedback loop that allows for the dynamic adjustment of the binning thresholds based on observed classification performance, enhancing the adaptability of method 1400 and associated systems to new data or changing environmental conditions.

Figure 8:
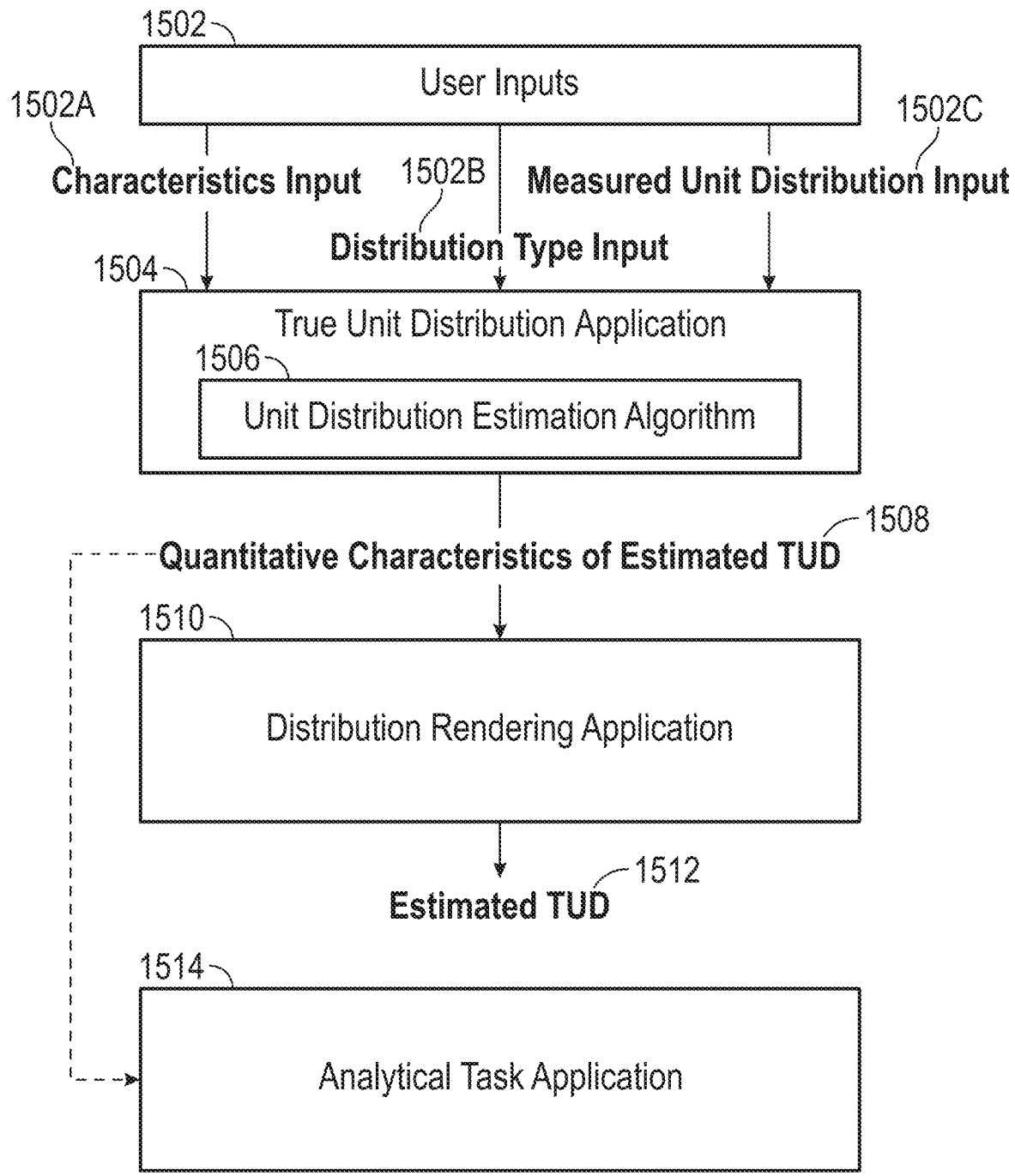
FIG. 8 illustrates example mixed block and flow diagram graphical user interfaces for dynamic specification limit calibration using an interactive graphical user interface and related simulation, according to at least one embodiment of the present technology.

Referring to FIG. 8, the diagram illustrates a mixed-block flow system for generating an estimated true unit distribution and using quantitative characteristics of the estimated true unit distribution to mitigation binning classification error associated with measured instances of a physical unit.

User Inputs 1502 may include a user interface, such as a GUI that is operating an analytics software application and/or that is in operable communication with an analytics compute service. In one or more embodiments, via the user interface, User Inputs 1502 may function to receive and/or obtain user inputs for creating an estimated true unit distribution. For instance, in a non-limiting example, via a user interface of User Inputs 1502, user inputs including characteristics input 1502A In some embodiments, User Inputs 1502 may receive data through a variety of interfaces, which might include touch screens, keyboard input, or even voice commands, providing flexibility in data entry modes according to user preference or situational requirements. In some embodiments, User Inputs 1502 may also be configured to automatically suggest the likely characteristics based on historical data or default settings, which enhances user experience and system efficiency. Accordingly, one or more Characteristics Input 1502A, Measured Unit Distribution Input 1502C, and Distribution Type Input 1502B may be facilitated via the one or more input and/or interface systems provided via a module or the like implementing user inputs 1502.

Characteristics Input 1502A preferably relates to input of various characteristics of the measurement device used in the measurements of a plurality of instances of a physical unit. Characteristics Input 1502A may also include configuration of measurement device settings, such as calibration data. It shall be noted that the module or computer processing system implementing user inputs 1502 may also include advanced error detection algorithms that not only validate the input data (e.g., 1502A, 1502B, 1502C, and the like) but also provide real-time feedback to the user, suggesting corrective actions for any detected data anomalies. In some embodiments, user inputs 1502 may function to process the inputs using a set of programmed or encoded validation rules or heuristics to ensure that the input data conforms to expected formats and ranges, thereby maintaining the integrity of the data used in subsequent computations.

Measured Unit Distribution Input 1502C preferably relates to input of the measured unit distribution derived from the measurement device. The module or computer processing system implementing user inputs 1502 may support various data formats for Measured Unit Distribution Input 1502C and may include error-checking algorithms to verify the accuracy of the input data. A validation process performed by user inputs 1502 might involve statistical analysis techniques to detect outliers or improbable data points before further processing. In some embodiments, user inputs 1502 may function to employ algorithms, including machine learning, to predict and autofill data fields based on previous entries, for streamlining the data entry process of Measured Unit Distribution Input 1502C.

Distribution Type Input 1502B preferably relates to input of the type of distribution to be used for fitting a set of measurement values of the physical unit to a target distribution. Distribution Type Input 1502B may be input to user inputs 1502 via a drop-down menu populated with various statistical distribution models like Normal, Binomial, Poisson, and/or the like. Each selection in the drop-down or similar menu may trigger different algorithmic pathways in the subsequent Unit Distribution Estimation Algorithm 1506, tailored to the selected distribution model. Accordingly, the Distribution Type Input 1502B may define the statistical model that Unit Distribution Estimation Algorithm 1506 may use to generate the estimated true unit distribution.

True Unit Distribution Application 1504 preferably includes one or more scripts and/or a software application specially programmed to memory and one or more processing circuits of a computer processing system executing the methods, processes, and/or various applications described herein. True unit distribution application 1504 may be configured to receive inputs, such as 1502A, 1502B, and 1502C. Utilizing unit distribution estimation algorithm 1506, true unit distribution application 1504 may function to compute quantitative characteristics of estimated true unit distribution 1508 as well estimated true unit distribution 1512 and transmit the outputs to one or more downstream applications and/or components of the computer processing system, such as distribution rendering application 1510 and/or analytical task application 1514. True Unit Distribution Application 1504 may utilize multi-threading or parallel processing techniques to enhance the computation speed and efficiency, especially when handling large datasets.

In one embodiment, the True Unit Distribution Application 1504 includes Unit Distribution Estimation Algorithm 1506, which processes inputs to compute an estimated true unit distribution. Unit Distribution Estimation Algorithm 1506 may include optimization routines that adjust computational resources dynamically based on the complexity of the input data (e.g., a selection of an arbitrary distribution shape), ensuring that the system remains efficient under varying load conditions. Unit Distribution Estimation Algorithm 1506 may employ advanced statistical methods and machine learning techniques to refine the accuracy of the estimated true unit distribution. As a non-limiting example, Unit Distribution Estimation Algorithm 1506 may involve the use of regression analysis, Bayesian inference, or neural networks, depending on the complexity and nature of the input data.

Based on one or more computations by true unit distribution application 1504, Quantitative Characteristics of Estimated TUD 1508 may be derived. Quantitative Characteristics of Estimated TUD 1508 may include data visualization tools that graphically represent these characteristics using histograms, box plots, or scatter plots. Such visualizations may provide insights into the data distribution and statistical metrics, including mean, median, and variance. Quantitative Characteristics of Estimated TUD 1508 may process the estimated true unit distribution to extract quantitative characteristics that may be used for further analysis and tasks, such as mitigating binning classification errors. Quantitative Characteristics of Estimated TUD 1508 may additionally include analytical values derived from executing one or more specific analytical tasks or assessments between an estimated true unit distribution and the measured unit distribution. In one or more embodiments, true unit distribution application 1504 employing unit distribution estimation algorithm 1508 may operate together with analytical task application 1514 to derive quantitative characteristics and analytical values that describe an analytical relationship (e.g., statistical differences and the like) between an estimated true unit distribution and a given measured unit distribution. Quantitative Characteristics of Estimated TUD 1508 may be applicable in various industry and technological domains, including but not limited to manufacturing, quality control, and research and development, where precise data measurement and analysis may be needed.

Figure 13:
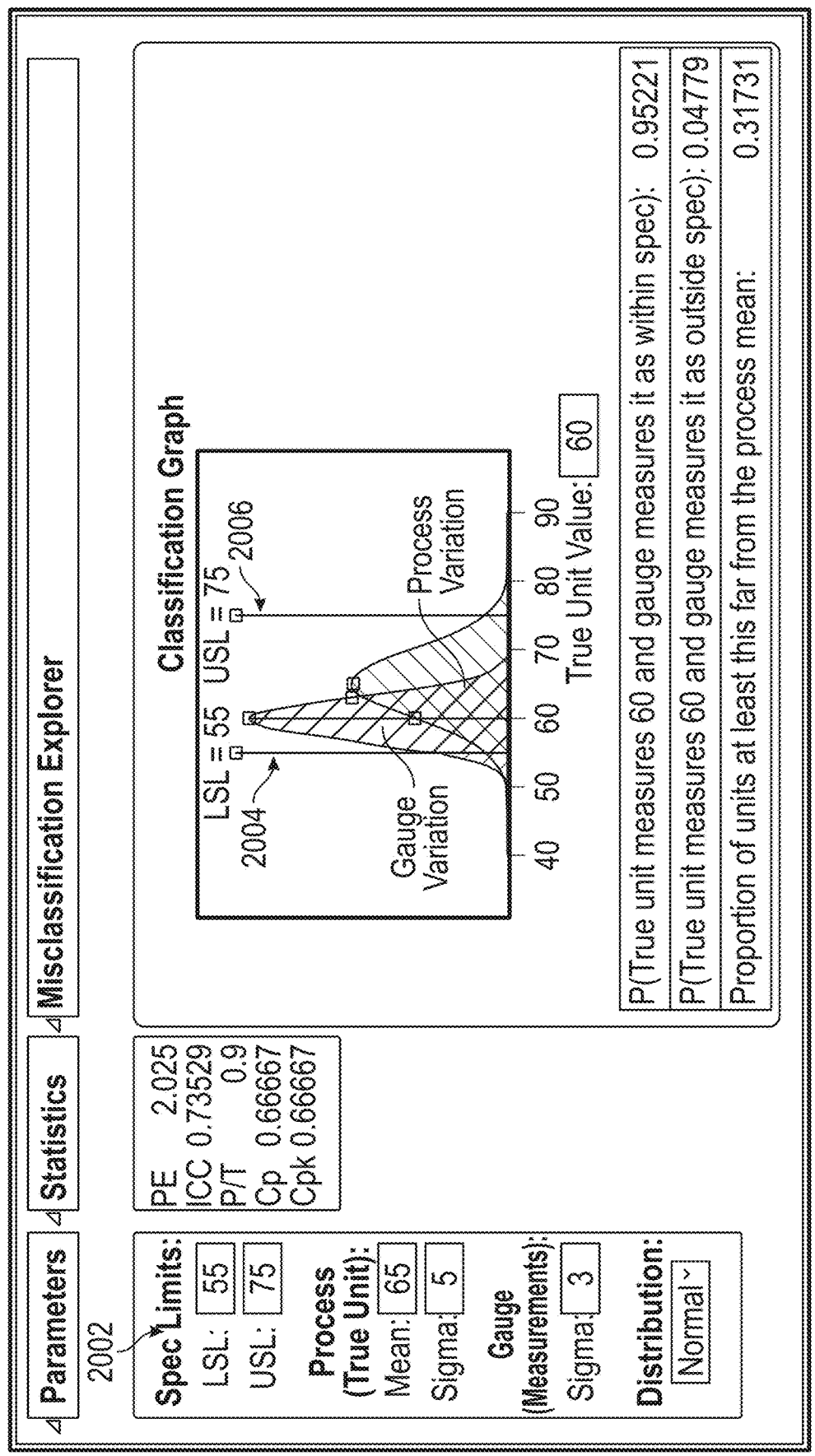
FIG. 13 illustrates an example interactive graphical user interface for generating binning intelligence for accurately classification physical units by selectively varying specification limits, according to at least one embodiment of the present technology.

Distribution Rendering Application 1510 may utilize the quantitative characteristics derived from the Estimated TUD 1508 to visualize the estimated true unit distribution, as shown by way of example in FIG. 11B and FIG. 13. Distribution Rendering Application 1510 may include interactive graphical elements that allow users to manipulate the visualization by zooming in or out, adjusting scales, or selecting specific data segments for detailed examination. Additionally, Distribution Rendering Application 1510 may include export features that enable users to download visualizations in various formats for reporting or presentation purposes. Distribution Rendering Application 1510 may also provide features that allow users to annotate and comment on visualizations to support collaborative analysis and decision-making.

Estimated TUD 1512 may provide a graphical representation of the estimated true unit distribution that assists users in visually understanding and analyzing the dataset. Estimated TUD 1512 may offer export options in multiple formats, allowing users to integrate the data with other tools and platforms for further analysis or presentation. The graphical output generated by Estimated TUD 1512 may be dynamically updated based on user interactions with the Distribution Rendering Application 1510, ensuring that visualizations reflect the latest processed data.

Analytical Task Application 1514 may utilize estimated true unit distribution 1512 to perform analytical tasks, such as predictive analytics to forecast future trends, cluster analysis to identify groups within the data, or decision tree analysis to support decision-making. Analytical Task Application 1514 may be modular, allowing for the integration of additional analytical methods based on user needs or technological developments. In some embodiments, Analytical Task Application 1514 may be hosted on cloud infrastructure to provide scalability and accessibility, enabling users to access the system from various locations without performance degradation. Analytical Task Application 1514 may also include custom modules and integrations that users can configure for specific industry-related analyses, such as wear and tear predictions in manufacturing or demographic analysis in market research. Additionally, Analytical Task Application 1514 may be integrated via an application programming interface (API) to various API endpoints including one or more enterprise applications, enhancing a utility of Analytical Task Application 1514 in broader technological ecosystems.

Referring to FIG. 9A, the GUI may enable, in one or more embodiments, a user to provide inputs for deriving an estimated true unit distribution and for performing simulations in one or more downstream applications. The GUI illustrated in FIG. 9A may include a plurality of GUI objects that enable a user to describe a given measured unit distribution.

The GUI of FIG. 9A may include an interactive module labeled 1602A, titled "Describe Measured Unit Distribution," which provides options to define the desired statistical distribution type for the measured unit distribution (MUD).

The GUI of FIG. 9A may present, adjacent to interactive module 1602A, a user-defined option 1602B labeled "User-Parametric." The user-defined option 1602B may allow customization of the MUD beyond conventional models to accommodate non-standard or complex data shapes. The user-defined option 1602B may support handling of various distribution types, including non-parametric distributions, to increase system adaptability and application scope. Quadratic and other statistical distributions may be utilized within user-defined option 1602B.

As shown in module 1602C, a list of predefined types of distributions may be provided for selection. The available options may include "Normal (2p)," representing a normal distribution with two parameters, "LogNormal (2p)," for a log-normal distribution also characterized by two parameters, and "Weibull (3p)," describing a Weibull distribution using three parameters. The predefined list in module 1602C may enable diverse analytical approaches depending on the nature of the data and the requirements of the analysis, allowing input of a type of distribution for fitting a set of measurement values to a target distribution. It shall be recognized that the listing of types of distribution may include different combinations and/or more or fewer types of distributions that may be selected.

On the right-hand side of the GUI of FIG. 9A, indicated by 1602D, the GUI section, such as "Set up MUD arbitrary shape", and may additionally include input object 1604, such as "Select Already Open Data Table" and input object 1606, such as "Open a Data Table." The input object 1604 and input object 1606 may facilitate direct data integration to data systems and/or memory components of a user by enabling the selection of currently active data tables or the opening of new ones, which supports accurate configuration and analysis of the MUD based on real-world data inputs.

The design of the GUI in FIG. 9A may support the flexible and precise setup of MUD shapes necessary for metrology and unit distribution analysis. The GUI in FIG. 9A may provide functionality for obtaining inputs related to the measured unit distribution and the characteristics of the measurement device. Additionally, the design of the GUI in FIG. 9A may reflect the integration of user inputs into computational models, facilitating the simulation of performance metrics and enhancing the utility of the system in various industrial applications.

Referring to FIG. 9B, by way of example, the graphical output may display an arbitrary measured unit distribution derived from inputs provided via FIG. 9A. The graph depicted in FIG. 9B may allow users to visually verify and analyze the distribution of measured values, which supports optimization of measurement accuracy and system calibration.

The graph presented in FIG. 9B may plot the measured unit distribution ("Meas Unit Dist") on the y-axis against the measured unit values ("Meas Unit Value") on the x-axis, providing a visual representation of data distribution across different measurement values. The visualization may aid in identifying characteristics of the distribution, such as central tendency, variability, frequency, and/or the presence of outliers, which support system calibration and data analysis.

In FIG. 9B, graph line 1612 may represent the distribution of measured unit values and may peak at a measured unit value around 62, indicating a concentration of data points. The peak of graph line 1612 may provide information for further processing and analysis, representing the most frequent measurement result within the graphed distribution. Analyzing the peak may enable adjustments in the manufacturing and/or measurement system to accommodate or correct for data clustering, potentially enhancing measurement fidelity and reliability.

The graph in FIG. 9B may function as a diagnostic tool and a feedback mechanism for users to refine input parameters and adjust system settings based on real data outputs. The graphical output illustrated in FIG. 9B may help maintain quality control and ensure that various system and/or process outputs remain within specified tolerances. Accordingly, the representation of the measured unit distribution may facilitate understanding of distribution dynamics, supporting accurate calibration of products, processes, and systems.

The analysis provided by the graphical output in FIG. 9B may support the computation of an estimated true unit distribution by verifying the initial measured data's accuracy before further processing. Verification of the initial measurement distribution may enable the use of quantitative characteristics of the estimated true unit distribution to mitigate binning classification error, forming a basis for accurately computing and applying calibrated specification limits.

Referring to FIG. 10, the GUI may be used to describe, understand, and/or facilitate the calibration of metrology characteristics, which may affect the precision of data collected through various measurement devices. The GUI may be designed to receive input and generate analytical metrology characteristics illustrating performances and/or characteristics of a given measurement device of a measurement systems.

The GUI layout, as shown in FIG. 10, may include data input section 1702, allowing users to provide gauge performance characteristics by entering values for bias, standard deviation, and optionally, linear coefficients that may affect the relationship between the gauge readings and the true unit values. Data input section 1702 may allow for the entry of a constant bias ("Bias") and a standard deviation ("St Dev"), which may be used to provide insights relating to the intrinsic error parameters of the measurement device. The bias entry at input section 1702 may allow users to specify a systemic deviation from the true unit value, which may occur in many measurement devices due to inherent inaccuracies. The standard deviation entry at input section 1702 may provide a space to define the expected range of variability in the measurements, reflecting the repeatability and reliability of the device. In some embodiments, statistics such as probable error may also be input into data input section 1702.

Below input section 1702 in FIG. 10, two graphical representations may provide visual feedback on how these inputted characteristics influence measurement accuracy. The upper graph may display the gauge standard deviation ("Gauge SD") across a range of true unit values, plotted on a coordinate system where the x-axis may represent the "True Unit Value" (TUV) and the y-axis may represent the "Gauge SD." The upper graph may assist in identifying any deviations in gauge behavior over the spectrum of expected unit values, illustrating how precision may vary across different measurements and supporting consistent gauge standard deviation within acceptable limits. In the example shown, a flat Gauge SD distribution may be observed across TUV.

The lower graph in FIG. 10, positioned below the upper graph, may illustrate the "Gauge Bias" plotted against the same range of "True Unit Value." The lower graph may demonstrate the stability or variability of the bias throughout the measurement range. The visualization of the lower graph may help confirm whether the bias remains constant or follows a predictable pattern, which may assist in calibrating the system to achieve accurate and reliable measurements. In the example shown, a flat Gauge Bias distribution may be observed across TUV.

Each graphical output in FIG. 10 may aid in the calibration process and provide a tool for diagnosing potential issues with the measuring equipment. By enabling users to visually compare and adjust these characteristics, the GUI may support control over measurement processes, which may impact the quality and credibility of the data collected. The functionality may be particularly applicable in contexts where high precision may be required because minimal errors could impact downstream design, analysis, or factory production environments.

Referring to FIG. 11A, the GUI may be used to handle and analyze metrology and unit distribution data. The GUI in FIG. 11A may allow users to specify the desired distribution shape of a True Unit Distribution (TUD), which may match the Measured Unit Distribution (MUD).

The GUI in FIG. 11A may include a dropdown menu or a scrolling menu, titled "Describe Desired True Unit Distribution Shape." The dropdown menu may function as a user interaction point, allowing the selection of a type of distribution suited to specific data analysis needs. The selection process may tailor the statistical processing to the nuances of different data sets, ensuring that the estimated true unit distribution aligns with the empirical data collected.

The dropdown menu in FIG. 11A may provide a plurality of options for distribution types, each represented with technical specificity. The option highlighted as 1802B, "Arbitrary Shape (non-parametric)," may indicate the currently active choice. The "Arbitrary Shape (non-parametric)" option may be used in scenarios where the data does not conform to standard parametric distribution models, offering flexibility in handling diverse and complex data structures. The non-parametric approach may facilitate a customized and potentially accurate fitting of the data for metrology analysis. Additional distribution types may be listed within menu 1802C, including "Normal (2p)" and "LogNormal (2p)," providing users with common statistical models known for their applicability in various scientific and engineering contexts. The additional types of distribution may cater to more standardized data analysis needs, where the underlying data distribution is assumed to follow these well-understood forms. Further down in the menu, the "Weibull (3p)" option 1802D may be included, typically utilized in reliability engineering and lifespan modeling. The "Weibull (3p)" option may support advanced statistical analysis pertinent to quality control and product reliability assessments.

The design of the GUI in FIG. 11A may exemplify a user-centric interaction environment. The setup may support operations involving the computation of an estimated true unit distribution based on varied inputs, including the type of distribution selected through the interface. The ability to select and apply different statistical distribution models may impact the accuracy and reliability of the metrology and unit distribution analysis, aligning with processes for adjusting and recalibrating measurement systems to mitigate errors and enhance data interpretation fidelity.

Referring to FIG. 11B, which may illustrate an example of a GUI for comparing the measured unit distribution (MUD) and the Estimated True Unit Distribution (TUD) results, FIG. 11B may demonstrate the functional interfacing and visual feedback necessary for analyzing metrology and unit distribution data.

The GUI depicted in FIG. 11B may enhance performance simulation through the visualization of metrology data. FIG. 11B may include a dual-line graph displaying two distinct unit distributions: the Input MUD 1812 line, which may represent the input measured unit distribution data, and the Estimated TUD 1814, which may represent the estimated true unit distribution data as indicated by the dotted line. The graphical representation in FIG. 11B may enable users to visually compare the two distributions and assess the accuracy and efficacy of the measurement system, as well as the computational algorithms used to derive the Estimated TUD.

The horizontal axis of the graph in FIG. 11B may denote 'Unit Value,' indicating the range over which the unit values, measured or simulated, are spread. The vertical axis, labeled 'Unit Dist' (short for Unit Distribution), may quantify the frequency or density of units corresponding to each unit value, providing a visual metric of distribution characteristics.

The peak of the Estimated TUD 1814 may represent the most probable unit value as estimated by the system's algorithms, considering the corrections and calibrations derived from inputs including the characteristics of the measurement device and the type of distribution selected by the user. The positioning of the peak of Estimated TUD 1814 may indicate the adjustment made from the Input MUD 1812 to the Estimated TUD 1814, reflecting the system's capability to refine the understanding of true unit characteristics based on computational analysis. The peak of the Input MUD 1812 may represent the most frequent unit value as measured by the measurement device, prior to any computational corrections or enhancements. The comparison between the graph lines of Input MUD 1812 and Estimated TUD 1814 may enable a visual analysis and identification of the error and/or differences between the measured unit distribution and the estimated true unit distribution.

The detailed representation and interactive capabilities of the GUI in FIG. 11B may allow users to manipulate data inputs and visually analyze the resultant impact on measured and estimated distributions. The functionality of the GUI in FIG. 11B may align with receiving user inputs via a GUI and providing simulations that support adjustments to specification limits based on these inputs.

Referring to FIG. 12, FIG. 12 illustrates an insight explorer GUI 1902 for optimizing manufacturing processes through the simulation of specification limit errors and their impact on binning classification errors and associated expenses. Insight Explorer GUI 1902 may contain a plurality of input fields positioned below the title bar for receiving manufacturing and/or unit-related data or specifications. The input fields may include options for entering revenue per unit, number of units, number of probable errors (PEs), manufacturing instructions derived from working specification limits (WSLs), expense to make a physical unit, and penalty for delivery of a non-conforming unit. The input fields of insight explorer GUI 1902 may offer selectable numerical inputs for probable errors and typeable numerical inputs for other fields. Insight Explorer GUI 1902 may provide a visualization and interaction model that allows users to manipulate and analyze complex data sets related to metrology and unit distribution, supporting strategic decision-making to improve production quality and performance.

In the left section of the GUI container 1904, performance expectations may be presented, combining user inputs in Insight Explorer GUI 1902 and calculations based on various inputs and options. Selectable options in the left section of GUI container 1904 may include bars and/or probable errors from the working specification limits (WSLs), which may involve associated upper specification limits (USLs) and lower specification limits (LSLs) set for the acceptable measurement range. The upper and/or lower specification limits may be modified for simulation purposes by clicking within GUI container 1904, allowing users to adjust the range to be wider or narrower. The interactive tool in GUI container 1904 may enable users to engage with the visual outcomes of different specification limit ranges by selecting various bars in the chart to visualize potential outcomes simulated by the working specification limits.

As depicted in GUI container 1904, a vertical bar chart 1906 may dynamically display the net performance implications based on various working specification limits. Each bar in the vertical bar chart 1906 may represent a potential performance outcome associated with specific manufacturing tolerances (e.g., specification limits or calibrated specification limits), where the height of the bars may indicate performance levels, considering anticipated or estimated penalties for delivering non-conforming units and expenses associated with producing units. The visual representation in the vertical bar chart 1906 may allow users to perceive the performance impact of different specification settings and support informed decision-making to optimize manufacturing parameters for performance while maintaining quality standards.

Additionally, FIG. 12 may show GUI object 1908, such as an asterisk, positioned above a certain point along the x-axis to indicate the optimal performance point. GUI object 1908 may help identify the greatest performance potential while quantitatively displaying the distance of units from working specification limits in units of probable errors (PEs) from WSLs. The probable error of a measurement distribution may refer to the range within which the middle 50% of all measurements are expected to be found, centered around the median. The graph in GUI 1908 may provide a visual assessment of how closely units adhere to or deviate from set manufacturing instructions or working specification limits for various performance simulations.

On the right side, as shown in GUI 1910, a horizontal bar graph may complement vertical bar chart 1906 by quantitatively displaying simulated performance and loss performance metrics based on the input to GUI 1910. The horizontal bar graph of GUI 1910 may provide a visual assessment of how scrapping and delivering non-conforming units compare to, or affect, the performance metrics from the delivery of conforming units for any simulated or set manufacturing tolerances. Below the horizontal bar graph, tabular data may be displayed to indicate performance implications, estimated occurrences, and the likelihood of units being truly out of specification, within specifications, or falsely classified. The values shown in GUI 1910 may be simulated based on the input data provided throughout the GUIs and input fields shown in FIG. 12.

Furthermore, the GUI of FIG. 12 may integrate interactive elements such as sliders and selectable options that allow users to manipulate the views and data presented. The interactive features of FIG. 12 may enable users to explore different scenarios and their implications on quality control and performance dynamically. For instance, adjustments made by selecting or sliding across probable errors in the vertical bar chart 1906 may instantly reflect changes in the graphical displays, including a re-simulation of the performance metrics associated with a new selection input or sliding input within the GUIs of FIG. 12.

FIG. 12 may illustrate an advanced GUI setup that supports detailed data interaction and visualization while enhancing user engagement. By providing tools for analysis and simulation of specification limits and their performance impacts in FIG. 12, the GUI may enable manufacturers to manage and optimize production processes by increasing production efficiencies, including reducing waste of a physical unit due to improperly set specification limits that fail to take into account metrology error.

Referring to FIG. 13, which illustrates a graphical tool for generating simulation designed to provide insights for setting upper and lower specification limits for increasing production efficiencies and reducing waste in a unit measurement and/or manufacturing settings due to improperly calibrated metrology and/or specification limits. FIG. 13 preferably illustrates a GUI that integrates statistical analysis with inputs and interactive tools to enhance understanding and accuracy in unit measurement and/or manufacturing settings.

The left section of the GUI in FIG. 13 that includes input section 2002 may present a structured data panel titled "Parameters." The Parameters panel may include categories such as Specification Limits, Process (True Unit), Gauge (Measurement), and Distribution. Under Specification Limits, example values such as Lower Specification Limit (LSL) of 55 and Upper Specification Limit (USL) of 75 may be indicated, defining the binning thresholds for classifying units based on measurement values. The Process section of FIG. 13 may list example values for the true unit's mean of 65 and a standard deviation (sigma) of 5, establishing the statistical nature of the true unit distribution. The Gauge section of FIG. 13 may specify example values for a measurement sigma of 3, indicating the variability inherent in the gauge's measurement capability. The Distribution setting of FIG. 13 may be set to one or more values including "Normal," specifying the type of statistical distribution applied to process data in the simulation, as previously described in FIG. 9A.

The second section of the GUI of FIG. 13 may contain a statistics (quantitative and/or qualitative) panel that includes example values for Probable Error (PE), Intraclass Correlation Coefficient (ICC), P/T (Unit/True), Process Capability Index (Cp), and Process Capability Index (Lower Specification Limit) (Cpk). The Intraclass Correlation Coefficient (ICC) may measure how strongly units in the same group resemble each other, which could reflect the consistency of output within a batch or from a specific machine in manufacturing. The Process Capability Index (Cp) may measure how well a process produces output within specified tolerance limits, where a higher Cp indicates a more capable process. The Process Capability Index (Cpk) may be a variation of Cp that considers the potential for the process mean to shift away from the target value, focusing on the worst-case scenario to ensure process capability even with a mean shift. P/T may represent the ratio of the measured unit value to the expected true unit value, either as an average or for a specific data point.

In the central and right sections of FIG. 13, a "Misclassification Explorer" container may provide an interactive classification graph. The classification graph may function as a dynamic insight tool that allows users to visualize how variations in process variation and gauge accuracy may lead to or minimize misclassifications and improve performance of a measurement and classification component of a manufacturing system. The interactive classification graph of FIG. 13 may delineate the Lower Specification Limit (LSL) 2004 and Upper Specification Limit (USL) 2006 and demonstrate distribution curves representing the probability density functions of the measured values. An example true unit value may be interactively displayed as 60, offering a practical example for insight and simulation purposes.

The interactive classification graph may illustrate how gauge variance and process variation contribute to the potential misclassification of units. The interactive classification graph may visually demonstrate the overlap of measurement distributions with specified limits, identifying scenarios where units may be incorrectly classified as conforming or nonconforming due to measurement inaccuracies.

The lower-right section of FIG. 13 may extend the insight value of the GUI by presenting calculated probabilities that highlight the chances of various measurement scenarios. For example, the probability that a true unit measures 60 and the gauge measures it as within specification may be an example value of 0.95221, indicating a high likelihood of correct classification. Conversely, the probability of a unit being measured as outside specification when it is within may be an example value of 0.04779, showcasing the effectiveness of the gauge under current settings and unit values. Additionally, the proportion of units at least this far from the process mean may be given as an example value of 0.31731, providing insights into the distribution of unit measurements relative to the process center.

The GUI in FIG. 13 may be designed to generate insights and/or intelligence for setting calibrated specification limits for mitigating an impact of measurement errors and thereby reducing waste due to binning misclassification and optimizing product quality within predefined specification thresholds. The capabilities demonstrated in FIG. 13 may align with operations related to manufacturing and/or decision-making (e.g., classifications and/or routing of units), enhancing metrological accuracy, process controls, and insight value.

Figure 14:
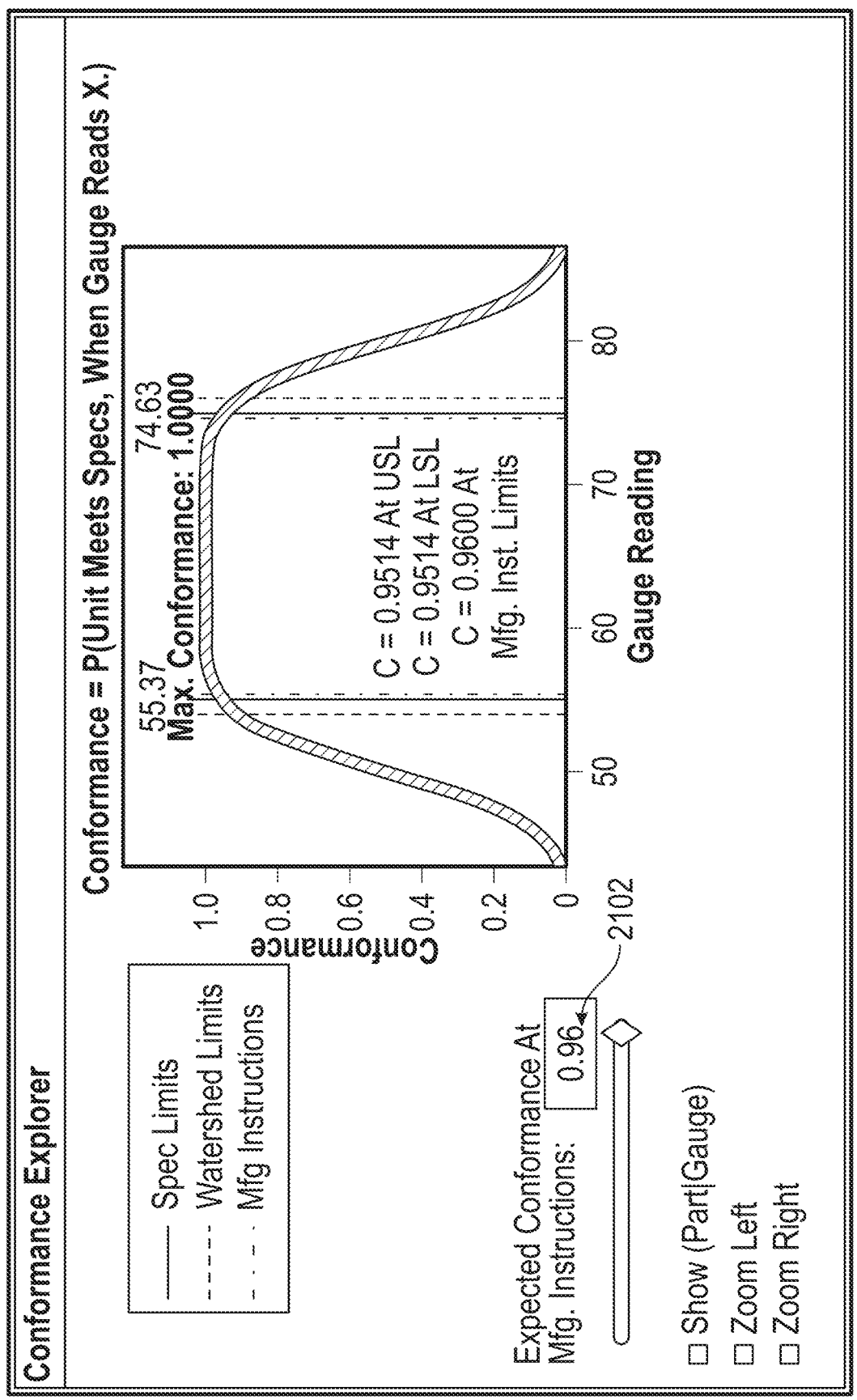
FIG. 14 illustrates an example interactive graphical user interface generating simulations of conformance of physical units, according to at least one embodiment of the present technology.

Referring to FIG. 14, which illustrates an insight simulator that may be utilized to understand the probability that true units meet specification limits based on measurements at various manufacturer instruction limits. FIG. 14 may outline a GUI designed to facilitate interaction and data visualization necessary for the simulation and analysis of unit compliance with predefined specifications.

FIG. 14 preferably includes a GUI container, labeled as the Conformance Explorer, an interactive module within the GUI. Conformance Explorer may provide users the ability to manipulate and observe the expected conformance of units to manufacturing instructions dynamically. The GUI container of Conformance Explorer may feature a slider mechanism that may impact the simulation output displayed in the central graph of the GUI. The slider may allow users to set or adjust input value 2102 associated with the "Expected conformance at mfg. instructions", which may be set to an example value of "+0.96" on the slider scale, representing a level of unit conformance under specific manufacturer-defined parameters.

In the graphical display area of the GUI of FIG. 14, a visualization titled "Conformance=P (Unit meets specs, when gauge reads X.)" may depict the probability distribution of units meeting the specified manufacturing criteria as a function of gauge reading. The probability distribution plot may provide a performance-related analytical output of the simulator, showing a bell-shaped curve of distribution data 2104. The graph in FIG. 14 may be annotated with metrics such as "Max. conformance: 1.000," indicating the highest conformance probability achievable across a range of gauge readings. The peak region of the distribution curve may signify the most likely gauge reading where units meet or exceed the specification limits, offering an operational outcome for manufacturing processes.

The graph in FIG. 14 may include lines representing different specification thresholds: solid black lines may denote the Specification Limits, dashed lines may represent Watershed Limits, and an additional solid line may depict the Manufacturing Instructions. The demarcations may function as references for understanding the distribution of conformance probabilities relative to different sets of manufacturing guidelines. The conformance curve may intersect the threshold lines at points labeled with conformance probabilities (C), such as "C=0.9514 at USL" and "C=0.9514 at LSL," providing quantifiable insights into the conformance levels achievable at various gauge readings.

The Conformance Explorer may include options such as "Show (Unit|Gauge)," "Zoom Left," and "Zoom Right," offering users tools to customize a view of the graph for detailed analysis or a broader perspective. The interactive features of the Conformance Explorer may enhance the usability of the simulator, making the module adaptable to various user requirements for data exploration and interpretation.

FIG. 14 may demonstrate a tool designed to aid insight and operational understanding of specification limits and associated implications on the classification of units and manufacturing performance. The GUI of FIG. 14 may integrate interactive elements with dynamic data visualization to provide a platform for simulation-based learning and decision-making in manufacturing quality control. The simulator interface may support presenting, via a GUI, types of distributions selectable by a user and simulations based on user inputs, ensuring that the system can predict and analyze unit conformance to varying imposed limits and specifications.

It shall be noted that the system and methods described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
   obtaining, via a graphical user interface:
      an input of a measured unit distribution derived from measurements, by a measuring device, of a plurality of instances of a physical unit;
      an input of a plurality of characteristics of the measuring device used in the measurements of the plurality of instances of the physical unit; and
      a selection input, from a user, of a type of distribution from a plurality of selectable distribution types via the graphical user interface, wherein the type of distribution selected by the user initializes a computation of an estimated true unit distribution with a model that guides a transformation of a set of measurement values of the physical unit to a target distribution;
   computing, via a unit distribution estimation algorithm, the estimated true unit distribution of the plurality of instances of the physical unit using the type of distribution selected by the user and based on (a) the input of the measured unit distribution and (b) the input of the plurality of characteristics of the measuring device; and displaying, via the graphical user interface, a graphical representation of the estimated true unit distribution alongside a graphical representation of the measured unit distribution, wherein quantitative characteristics of the estimated true unit distribution facilitate a determination of computer-executable controls for a computerized binning classification system that mitigate binning classification error for the plurality of instances of the physical unit.

2. The computer-program product according to claim 1, wherein performing the operations further comprises:

determining one or more calibrated specification limits based on the quantitative characteristics of the estimated true unit distribution, wherein the one or more calibrated specification limits comprise a modification to one or more previously-provided specification limits based on metrology error associated with the plurality of characteristics of the measuring device.

3. The computer-program product according to claim 2, wherein the one or more calibrated specification limits, when applied to measurement values produced by the measuring device when measuring the plurality of instances of the physical unit, mitigate an error, caused by the measuring device, in classifying a subset of the plurality of instances of the physical unit to one or more incorrect bins of a plurality of distinct bins for the physical unit.

4. The computer-program product according to claim 2, wherein the one or more calibrated specification limits include an upper calibrated specification limit that, when applied to given measurements by the measuring device of the plurality of instances of the physical unit, enables an assignment of a subset of the plurality of instances of the physical unit:

to one or more conformant bins for measurement values satisfying the upper calibrated specification limit, or to one or more nonconformant bins for measurement values that do not satisfy the upper calibrated specification limit.

5. The computer-program product according to claim 2, wherein the one or more calibrated specification limits include a lower calibrated specification limit that, when applied to given measurements by the measuring device of the plurality of instances of the physical unit, enables an assignment of a subset of the plurality of instances of the physical unit:

to one or more conformant bins for measurement values satisfying the lower calibrated specification limit, or to one or more nonconformant bins for measurement values that do not satisfy the lower calibrated specification limit.

6. The computer-program product according to claim 2, wherein determining the one or more calibrated specification limits based on the quantitative characteristics of the estimated true unit distribution, when applied to the computerized binning classification system, encodes the one or more calibrated specification limits to one or more automated controllers of the computerized binning classification system that routes each of the plurality of instances of the physical unit to one bin of a plurality of distinct bins based on a computed classification for each of the plurality of instances of the physical unit.

7. The computer-program product according to claim 2, further comprising:

displaying:

in a first portion of the graphical user interface, a graphical data structure that graphically illustrates a performance metric associated with each of the one or more calibrated specification limits; and receiving, via the graphical user interface, a selection input by the user of a graphical element of the graphical data structure that causes:

an automatic change of current values of one or more specification limits designated for the graphical data structure to new values of the one or more specification limits based on the graphical element selected by the user.

8. The computer-program product according to claim 2, further comprising:

displaying:

in a first portion of the graphical user interface, a graphical data structure that graphically illustrates a performance metric associated with each of the one or more calibrated specification limits; and receiving, via the graphical user interface, a manipulation input of a selection element of the graphical data structure that causes:

an automatic change of current values of specification limits designated for the graphical data structure to new values of the specification limits based on the manipulation input of the selection element.

9. The computer-program product according to claim 1, wherein performing the operations further comprises:

computing one or more calibrated specification limits including computing one or more unit binning thresholds using inputs of (a) one or more previously-provided specification limits and (b) metrology error associated with the plurality of characteristics of the measuring device.

10. The computer-program product according to claim 1, wherein the graphical user interface comprises a dropdown menu configured to receive the user selection of the type of distribution, wherein the automated binning system updates distribution fitting parameters of the unit distribution estimation algorithm based on the user selection of the type of distribution.

11. The computer-program product according to claim 1, wherein:

the selection input of the type of distribution by the user initializes the unit distribution estimation algorithm with the selected type of distribution as a starting parameter, and the unit distribution estimation algorithm processes the measured unit distribution to align it with the selected type of distribution by applying one or more error optimization techniques that compensates for measurement bias in the set of measurement values of the physical unit.

12. The computer-program product according to claim 1, wherein the unit distribution estimation algorithm dynamically adjusts one or more computational resources based on a complexity of the type of distribution selected by the user, the dynamic adjustment comprising allocating additional processing threads or memory resources when the type of distribution selected by the user comprises a non-parametric distribution or an arbitrarily-shaped distribution.

13. The computer-program product according to claim 1, wherein:

the graphical user interface includes one or more graphical user interface objects for configuring a non-parametric distribution based on the type of distribution selected by the user comprising a non-parametric type of distribution, and based on an operation by the user of the one or more graphical user interface objects, the graphical user interface integrates with one or more data systems allowing the user to select one or more datasets that, when selected, configures the non-parameter distribution.

14. A computer-implemented method comprising:
obtaining, via a graphical user interface:
an input of a measured unit distribution derived from measurements, by a measuring device, of a plurality of instances of a physical unit;
an input of a plurality of characteristics of the measuring device used in the measurements of the plurality of instances of the physical unit; and
a selection input, from a user, of a type of distribution from a plurality of selectable distribution types via the graphical user interface, wherein the type of distribution selected by the user initializes a computation of an estimated true unit distribution with a model that guides a transformation of a set of measurement values of the physical unit to a target distribution;
computing, via a unit distribution estimation algorithm, the estimated true unit distribution of the plurality of instances of the physical unit using the type of distribution selected by the user and based on (a) the input of the measured unit distribution and (b) the input of the plurality of characteristics of the measuring device; and
displaying, via the graphical user interface, a graphical representation of the estimated true unit distribution alongside a graphical representation of the measured unit distribution,
wherein quantitative characteristics of the estimated true unit distribution, facilitate a determination of computer-executable controls for a computerized binning classification system that mitigate binning classification error for the plurality of instances of the physical unit.

15. The computer-implemented method according to claim 14, wherein using the quantitative characteristics of the estimated true unit distribution to mitigate binning classification error includes:
determining one or more calibrated specification limits based on the quantitative characteristics of the estimated true unit distribution, wherein the one or more calibrated specification limits comprise a modification to one or more previously-provided specification limits based on metrology error associated with the plurality of characteristics of the measuring device.

16. The computer-implemented method according to claim 15, wherein the one or more calibrated specification limits include an upper calibrated specification limit that, when applied to given measurements by the measuring device of the plurality of instances of the physical unit, enables an assignment of a subset of the plurality of instances of the physical unit:
to one or more conformant bins for measurement values satisfying the upper calibrated specification limit, or
to one or more nonconformant bins for measurement values that do not satisfy the upper calibrated specification limit.

17. The computer-implemented method according to claim 15, wherein the one or more calibrated specification limits include a lower calibrated specification limit that, when applied to given measurements by the measuring device of the plurality of instances of the physical unit, enables an assignment of a subset of the plurality of instances of the physical unit:
to one or more conformant bins for measurement values satisfying the lower calibrated specification limit, or
to one or more nonconformant bins for measurement values that do not satisfy the lower calibrated specification limit.

18. The computer-implemented method according to claim 14, wherein using the quantitative characteristics of the estimated true unit distribution to mitigate binning classification error includes:
computing one or more calibrated specification limits including computing one or more unit binning thresholds using inputs of (a) one or more previously-provided specification limits and (b) metrology error associated with the plurality of characteristics of the measuring device.

19. A computer-implemented system comprising:
one or more processors;
a memory;
a computer-readable medium operably coupled to the one or more processors, the computer-readable medium having computer-readable instructions stored thereon that, when executed by the one or more processors, cause a computing device to perform operations comprising:
obtaining, via a graphical user interface:
an input of a measured unit distribution derived from measurements, by a measuring device, of a plurality of instances of a physical unit;
an input of a plurality of characteristics of the measuring device used in the measurements of the plurality of instances of the physical unit; and
a selection input, from a user, of a type of distribution from a plurality of selectable distribution types via the graphical user interface, wherein the type of distribution selected by the user initializes a computation of an estimated true unit distribution with a model that guides a transformation of a set of measurement values of the physical unit to a target distribution;
computing, via one or more computer processors executing a unit distribution estimation algorithm, the estimated true unit distribution of the plurality of instances of the physical unit using the type of distribution selected by the user and based on (a) the input of the measured unit distribution and (b) the input of the plurality of characteristics of the measuring device; and
displaying, via the graphical user interface, a graphical representation of the estimated true unit distribution alongside a graphical representation of the measured unit distribution,
wherein quantitative characteristics of the estimated true unit distribution facilitate a determination of computer-executable controls for a computerized binning classification system that mitigate binning classification error for the plurality of instances of the physical unit.

20. The computer-implemented system according to claim 19, wherein using the quantitative characteristics of the estimated true unit distribution to mitigate binning classification error includes:
determining one or more calibrated specification limits based on the quantitative characteristics of the estimated true unit distribution, wherein the one or more calibrated specification limits comprise a modification to one or more previously-provided specification limits based on metrology error associated with the plurality of characteristics of the measuring device.

21. The computer-implemented system according to claim 20, wherein the one or more calibrated specification limits include an upper calibrated specification limit that, when applied to given measurements by the measuring device of the plurality of instances of the physical unit, enables an assignment of a subset of the plurality of instances of the physical unit:
- to one or more conformant bins for measurement values satisfying the upper calibrated specification limit, or
- to one or more nonconformant bins for measurement values that do not satisfy the upper calibrated specification limit.

22. The computer-implemented system according to claim 20, wherein the one or more calibrated specification limits include a lower calibrated specification limit that, when applied to given measurements by the measuring device of the plurality of instances of the physical unit, enables an assignment of a subset of the plurality of instances of the physical unit:
- to one or more conformant bins for measurement values satisfying the lower calibrated specification limit, or
- to one or more nonconformant bins for measurement values that do not satisfy the lower calibrated specification limit.

23. The computer-implemented system according to claim 19, wherein using the quantitative characteristics of the estimated true unit distribution to mitigate binning classification error includes:
- computing one or more calibrated specification limits including computing one or more unit binning thresholds using inputs of (a) one or more previously-provided specification limits and (b) metrology error associated with the plurality of characteristics of the measuring device.

* * * * *